(12) United States Patent
Iwasaki et al.

(10) Patent No.: US 11,794,816 B2
(45) Date of Patent: Oct. 24, 2023

(54) AUTOMATED DRIVING VEHICLE

(71) Applicant: HONDA MOTOR CO., LTD., Tokyo (JP)

(72) Inventors: Shun Iwasaki, Wako (JP); Hisao Asaumi, Wako (JP); Kentaro Ishisaka, Wako (JP); Izumi Kondo, Wako (JP); Satoshi Koike, Wako (JP); Tomohisa Manabe, Wako (JP); Yo Ito, Tokyo (JP); Yuki Hayashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 837 days.

(21) Appl. No.: 16/621,071

(22) PCT Filed: Jun. 15, 2018

(86) PCT No.: PCT/JP2018/022991
§ 371 (c)(1),
(2) Date: Dec. 10, 2019

(87) PCT Pub. No.: WO2018/230720
PCT Pub. Date: Dec. 20, 2018

(65) Prior Publication Data
US 2020/0207419 A1    Jul. 2, 2020

(30) Foreign Application Priority Data

Jun. 16, 2017  (JP) .................................. 2017-119131

(51) Int. Cl.
*B62D 24/00* (2006.01)
*B60R 16/03* (2006.01)
(Continued)

(52) U.S. Cl.
CPC .............. *B62D 24/00* (2013.01); *B60R 16/03* (2013.01); *B62D 63/025* (2013.01); *G05D 1/0212* (2013.01); *G05D 1/0088* (2013.01)

(58) Field of Classification Search
CPC ...... B62D 24/00; B62D 63/025; B60R 16/03; G05D 1/0212; G05D 1/0088
(Continued)

(56) References Cited

U.S. PATENT DOCUMENTS 6,060,993 A    5/2000  Cohen
6,236,330 B1   5/2001  Cohen
(Continued)

FOREIGN PATENT DOCUMENTS

JP    03-044800    4/1991
JP    09-153098    6/1997
(Continued)

OTHER PUBLICATIONS

Japanese Office Action for Japanese Patent Application No. 2020-006723 dated Jun. 28, 2022.
(Continued)

*Primary Examiner* — Mahmoud S Ismail
(74) *Attorney, Agent, or Firm* — AMIN, TUROCY & WATSON, LLP

(57) ABSTRACT

An automated driving vehicle includes: a traveling unit to which an upper structure can be attached and which does not have a passenger compartment; and a connector provided in the traveling unit and connected to the upper structure detachably attached to the traveling unit.

6 Claims, 19 Drawing Sheets

(51) Int. Cl.
  *B62D 63/02* (2006.01)
  *G05D 1/02* (2020.01)
  *G05D 1/00* (2006.01)

(58) Field of Classification Search
  USPC .......................................................... 701/25
  See application file for complete search history.

(56) References Cited

U.S. PATENT DOCUMENTS

| | | | |
|---|---|---|---|
| 6,545,596 | B1 | 4/2003 | Moon |
| 6,857,889 | B1 | 2/2005 | Vitale |
| 6,898,517 | B1 | 5/2005 | Froeberg |
| 7,154,383 | B2 | 12/2006 | Berquist |
| 8,024,111 | B1 | 9/2011 | Meadows et al. |
| 8,958,943 | B2 | 2/2015 | Bertosa et al. |
| 9,216,745 | B2 | 12/2015 | Beardsley et al. |
| 9,791,861 | B2 | 10/2017 | Keohane et al. |
| 11,049,208 | B2 | 6/2021 | Petroff |
| 11,364,447 | B2 * | 6/2022 | Allmendinger ...... A63H 17/264 |
| 2002/0198747 | A1 | 12/2002 | Boyer et al. |
| 2005/0022134 | A1 | 1/2005 | Tokashiki |
| 2005/0096974 | A1 | 5/2005 | Chagoly et al. |
| 2008/0143141 | A1 * | 6/2008 | Ruslanov ............. A63H 17/002 |
| | | | 296/181.1 |
| 2009/0303079 | A1 | 12/2009 | Khim |
| 2010/0036717 | A1 | 2/2010 | Trest |
| 2010/0292886 | A1 | 11/2010 | Szczerba et al. |
| 2011/0101646 | A1 | 5/2011 | Sakita |
| 2012/0013179 | A1 | 1/2012 | Muto et al. |
| 2012/0120930 | A1 | 5/2012 | Ji et al. |
| 2012/0142415 | A1 | 6/2012 | Lindsay |
| 2012/0181781 | A1 * | 7/2012 | Gaussin ................ B62D 21/20 |
| | | | 29/525.08 |
| 2013/0113936 | A1 | 5/2013 | Cohen et al. |
| 2013/0162639 | A1 | 6/2013 | Muench et al. |
| 2014/0081764 | A1 | 3/2014 | James |
| 2014/0095234 | A1 | 4/2014 | Johnson |
| 2014/0121883 | A1 | 5/2014 | Shen et al. |
| 2014/0365250 | A1 | 12/2014 | Ikeda et al. |
| 2015/0046187 | A1 | 2/2015 | Johnson et al. |
| 2015/0051778 | A1 | 2/2015 | Mueller |
| 2015/0062469 | A1 | 3/2015 | Fleury |
| 2015/0066282 | A1 | 3/2015 | Yopp |
| 2015/0112800 | A1 | 4/2015 | Binion et al. |
| 2015/0161526 | A1 | 6/2015 | Yalcin et al. |
| 2015/0220991 | A1 | 8/2015 | Butts et al. |
| 2015/0227888 | A1 | 8/2015 | Levanon et al. |
| 2015/0271532 | A1 | 9/2015 | Igarashi |
| 2015/0293509 | A1 | 10/2015 | Bankowski et al. |
| 2015/0345814 | A1 | 12/2015 | Nakano et al. |
| 2016/0063862 | A1 | 3/2016 | Rosen |
| 2016/0082839 | A1 | 3/2016 | Ricci |
| 2016/0089610 | A1 | 3/2016 | Boyle et al. |
| 2016/0121907 | A1 | 5/2016 | Otake |
| 2017/0061561 | A1 | 3/2017 | Cha |
| 2017/0075366 | A1 | 3/2017 | Esselink et al. |
| 2017/0109805 | A1 | 4/2017 | Eisen |
| 2018/0060827 | A1 | 3/2018 | Abbas et al. |
| 2018/0102964 | A1 | 4/2018 | Kao et al. |
| 2018/0182055 | A1 | 6/2018 | Jepson et al. |
| 2018/0224844 | A1 | 8/2018 | Zhang et al. |
| 2018/0275661 | A1 | 9/2018 | Glaser |
| 2020/0189466 | A1 | 6/2020 | Askeland |
| 2020/0398915 | A1 * | 12/2020 | Birnschein ............. B62D 65/12 |

FOREIGN PATENT DOCUMENTS

| | | |
|---|---|---|
| JP | 10-254946 | 9/1998 |
| JP | 11-231935 | 8/1999 |
| JP | 2000-035337 | 2/2000 |
| JP | 2001-154733 | 6/2001 |
| JP | 2002-099961 | 4/2002 |
| JP | 2002-186055 | 6/2002 |
| JP | 2002-187577 | 7/2002 |
| JP | 2002-288521 | 10/2002 |
| JP | 2003-063301 | 3/2003 |
| JP | 2003-199083 | 7/2003 |
| JP | 2003-259354 | 9/2003 |
| JP | 2003-308265 | 10/2003 |
| JP | 2004-061285 | 2/2004 |
| JP | 2004-192366 | 7/2004 |
| JP | 2004-194007 | 7/2004 |
| JP | 2004-234469 | 8/2004 |
| JP | 2004-362064 | 12/2004 |
| JP | 2005-004407 | 1/2005 |
| JP | 2005-032066 | 2/2005 |
| JP | 2005-056134 | 3/2005 |
| JP | 2005-066745 | 3/2005 |
| JP | 2006-018570 | 1/2006 |
| JP | 2007-080060 | 3/2007 |
| JP | 2007-172378 | 7/2007 |
| JP | 2007-228551 | 9/2007 |
| JP | 2008-103828 | 5/2008 |
| JP | 2008-534372 | 8/2008 |
| JP | 2008-280813 | 11/2008 |
| JP | 2009-015760 | 1/2009 |
| JP | 2009-105787 | 5/2009 |
| JP | 2010-204708 | 9/2010 |
| JP | 2010-237411 | 10/2010 |
| JP | 2011-162273 | 8/2011 |
| JP | 2012-108599 | 6/2012 |
| JP | 2013-109469 | 6/2013 |
| JP | 2013-210713 | 10/2013 |
| JP | 2013-214167 | 10/2013 |
| JP | 2014-006890 | 1/2014 |
| JP | 2014-238831 | 12/2014 |
| JP | 2015-085807 | 5/2015 |
| JP | 2015-090676 | 5/2015 |
| JP | 2015-092327 | 5/2015 |
| JP | 2015-093078 | 5/2015 |
| JP | 2015-179414 | 10/2015 |
| JP | 2015-184710 | 10/2015 |
| JP | 2015-184885 | 10/2015 |
| JP | 2015-191264 | 11/2015 |
| JP | 2015-206655 | 11/2015 |
| JP | 2016-040151 | 3/2016 |
| JP | 2016-065938 | 4/2016 |
| JP | 2016-090274 | 5/2016 |
| JP | 2016-206715 | 12/2016 |
| JP | 2017-033480 | 2/2017 |
| JP | 2017-061168 | 3/2017 |
| JP | 2017-083446 | 5/2017 |
| JP | 2017-191371 | 10/2017 |
| JP | 2018-008688 | 1/2018 |
| WO | 2017/033172 | 3/2017 |
| WO | 2018/230677 | 12/2018 |
| WO | 2018/230678 | 12/2018 |
| WO | 2018/230679 | 12/2018 |
| WO | 2018/230685 | 12/2018 |
| WO | 2018/230691 | 12/2018 |
| WO | 2018/230698 | 12/2018 |
| WO | 2018/230704 | 12/2018 |
| WO | 2018/230709 | 12/2018 |

OTHER PUBLICATIONS

Japanese Office Action for Japanese Patent Application No. 2020-006009 dated Jul. 5, 2022.
Final Office Action for U.S. Appl. No. 16/622,336 dated Mar. 3, 2022.
Non-Final Office Action for U.S. Appl. No. 16/621,456 dated Mar. 22, 2022.
Daily, et al. "WebOn World: Geo-coded Video and Spatial Audio in Vehicles," 2007 IEEE Aerospace Conference, 2007, pp. 1-13.
Kabir, et al. "SocioTelematics: Leveraging Interaction-Relationships in Developing Telematics Systems to Support Cooperative Convoys," 2012 9th International Conference on Ubiquitous Intelligence and Computing and 9th International Conference on Autonomic and Trusted Computing.
Japanese Office Action for JP Patent Application No. 2020-006390 dated Jul. 19, 2022.

(56) References Cited

OTHER PUBLICATIONS

Non-Final Office Action for U.S. Appl. No. 16/622,336 dated Oct. 14, 2021.
Non-Final Office Action for U.S. Appl. No. 16/621,458 dated Nov. 8, 2021.
Non-Final Office Action for U.S. Appl. No. 16/622,012 dated Aug. 30, 2021.
Japanese Office Action for Japanese Ptent Application No. 2020-006808 dated Aug. 23, 2022.
International Search Report and Written Opinion for International Application Serial No. PCT/JP2018/022991 dated Aug. 21, 2018, 7 pages.
International Search Report for International Application Serial No. PCT/JP2018/022825 dated Sep. 18, 2018, 2 pages.
International Search Report for International Application Serial No. PCT/JP2018/023043 dated Sep. 18, 2018, 4 pages.
International Search Report for International Application Serial No. PCT/JP2018/022929 dated Jul. 17, 2018, 4 pages.
International Search Report for International Application Serial No. PCT/JP2018/022829 dated Aug. 21, 2018, 2 pages.
International Search Report for International Application Serial No. PCT/JP2018/022919 dated Sep. 18, 2018, 4 pages.
International Search Report for International Application Serial No. PCT/JP2018/022875 dated Sep. 11, 2018, 4 pages.
International Search Report for International Application Serial No. PCT/JP2018/022852 dated Sep. 18, 2018, 2 pages.
International Search Report for International Application Serial No. PCT/JP2018/022826 dated Sep. 18, 2018, 8 pages.
International Search Report for International Application Serial No. PCT/JP2018/022991 dated Aug. 21, 2018, 3 pages.
International Search Report for International Application Serial No. PCT/JP2018/022845 dated Sep. 18, 2018, 4 pages.
Carcade In-Car Gaming, OH GIZMO!, Oct. 8, 2008, search date Sep. 4, 2018, internet<URL: https://www.gizmodo.jp/2008/10/carcadear.html>.
Gizmodo, AR world (video clip) of "Carcade" in which the scenery of the car window becomes arcade game, Oct. 10, 2008, search date Sep. 4, 2018, internet<URL: https://www.gizmodo.jp/2008/10/carcadear.html>.
Non-Final Office Action for U.S. Appl. No. 16/622,335 dated Apr. 26, 2022.
Final Office Action for U.S. Appl. No. 16/621,458 dated May 2, 2022.
Non-Final Office Action for U.S. Appl. No. 16/622,007 dated May 31, 2022.
Non-Final Office Action for JP Patent Application No. 2020-006721 dated Jun. 7, 2022.
Non-Final Office Action for U.S. Appl. No. 16/622,026 dated Jun. 20, 2022.
Non-Final Office Action for U.S. Appl. No. 16/622,008 dated Oct. 27, 2020.
V. Cichella, T. Marinho, D. Stipanovic, N. Hovakimyan, I. Kaminer and A. Trujillo, "Collision avoidance based on line-of-sight angle,", 2015 54th IEEE Conference on Decision and Control (CDC), 2015, pp. 6779-6784.
Non-Final Office Action for U.S. Appl. No. 16/621,456 dated Jul. 14, 2022.
Final Office Action for U.S. Appl. No. 16/622,077 dated Dec. 13, 2022.
MobilityWorks, "Assisted Living Resident Transportation: Beyond the Occasional Doctor's Appointment", May 10, 2014.
On Time Ambulance, "10 Ways to Transport a Senior to the Doctor or Other Appointments", On Time Medical Transportation, Jul. 28, 2016.
Japanese Notice of Allowance for Japanese Patent Application No. 2020-006009 dated Oct. 4, 2022.
Final Office Action for U.S. Appl. No. 16/622,335 dated Sep. 29, 2022.

\* cited by examiner

AUTOMATED DRIVING VEHICLE

TECHNICAL FIELD

The present invention relates to an automated driving vehicle.

This application claims priority to and the benefit from Japanese Patent Application No. 2017-119131, filed on Jun. 16, 2017, the contents of which are hereby incorporated by reference into the present application.

BACKGROUND ART

In recent years, development of an automated driving technology for allowing a vehicle to travel along a route to a destination according to automated driving has progressed (see Patent Document 1).

PRIOR ART DOCUMENTS

Patent Documents

Patent Document 1: Japanese Patent Application Publication No. 2017-083446

SUMMARY OF INVENTION

Problems to be Solved by the Invention

However, there are cases where it is desirable if an automated driving vehicle can be used for a plurality of uses.

The present invention has been made in consideration of these circumstances and one object thereof is to provide an automated driving vehicle which can be used for a plurality of uses.

Solution to Problem

An automated driving vehicle according to the present invention employs the following configuration.
(1) According to an aspect of the present invention provides an automated driving vehicle including: a traveling unit to which an upper structure can be attached and which does not have a passenger compartment; and a first connector provided in the traveling unit and connected to the upper structure detachably attached to the traveling unit.
(2) In the aspect of (1), the traveling unit has an attachment region to which the upper structure can be attached, a first wheel, and a second wheel positioned closer to a rear side than the first wheel in a vehicle traveling direction, and the attachment region has a size extending at least from approximately the same position as the first wheel in the vehicle traveling direction to approximately the same position as the second wheel.
(3) In the aspect of (2), the attachment region extends over an entire length of the traveling unit in the vehicle traveling direction.
(4) In the aspect of any one of (1) to (3), the traveling unit has a wheel, and a largest thickness of the traveling unit excluding the wheel is equal to or smaller than a diameter of the wheel.
(5) In the aspect of any one of (1) to (4), the traveling unit includes: an acquirer that acquires information related to a destination of the automated driving vehicle; a driving plan generator that generates a driving plan of the automated driving vehicle on the basis of the destination acquired by the acquirer and map information including road information; and an automated driving controller that controls traveling of the traveling unit on the basis of the driving plane generated by the driving plan generator.
(6) In the aspect of any one of (1) to (5), the upper structure includes a seat device on which an occupant can sit.
(7) In the aspect of any one of (1) to (6), the upper structure includes a room which an occupant can enter.
(8) In the aspect of any one of (1) to (7), the upper structure includes a luggage support capable of supporting luggage.
(9) In the aspect of any one of (1) to (8), the traveling unit is configured such that a plurality of upper structures can be switchably loaded thereon.
(10) In the aspect of any one of (1) to (9), the traveling unit has a support that, when a traveling unit of another automated driving vehicle is loaded on the traveling unit from an upper side, supports the traveling unit of the other automated driving vehicle from a lower side, and the traveling unit can travel in a state in which the traveling unit of the other automated driving vehicle is loaded thereon.
(11) In the aspect of any one of (1) to (10), the automated driving vehicle further includes: a second connector provided in the traveling unit and connected to a traveling unit of another automated driving vehicle arranged in parallel to the traveling unit at least in one of a vehicle traveling direction and a vehicle width direction.
(12) Another aspect of the present invention provides a plate-shaped automated driving vehicle to which an upper structure can be attached and which does not have a passenger compartment.

Advantageous Effects of Invention

According to the aspect of (1) or (12), it is possible to provide an automated driving vehicle which can be used in a plurality of uses. That is, by attaching an arbitrary upper structure onto the traveling unit, it is possible to provide a function corresponding to a use to an automated driving vehicle.

According to the aspect of (2), the traveling unit has a relatively wide attachment region. Due to this, it is possible to increase the degree of freedom of an upper structure configured to be attachable to the traveling unit.

According to the aspect of (3), the traveling unit has a wider attachment region. Due to this, it is possible to further increase the degree of freedom of an upper structure configured to be attachable to the traveling unit.

According to the aspect of (4), since the traveling unit is relatively thin, it is possible to increase the degree of freedom in a height direction of the upper structure. Moreover, when the traveling unit is relatively thin, it is possible to reduce a workload of attaching the upper structure to the attachment region.

According to the aspect of (5), it is possible to attach an arbitrary upper structure to a vehicle for which a driving plan is generated on the basis of map information including road information. Due to this, it is possible to provide a function corresponding to the use to a vehicle capable of traveling on a public road, for example.

According to the aspects of (6) to (8), it is possible to provide a predetermined function like an automobile, a truck, and a cargo conveyer to a vehicle.

According to the aspect of (9), it is possible to switch functions to be provided to a vehicle depending on the location of use, a time period, and the like. Due to this, it is possible to use one vehicle more effectively.

According to the aspect of (10), it is possible to arrange a plurality of vehicles in a small space and move a plurality of vehicles in a state of being arranged in a small space. This contributes to further enhancing the usability of vehicles.

According to the aspect of (11), since a plurality of automated driving vehicles are connected by the second connector, it is possible to support an upper structure having a size that cannot be supported in one automated driving vehicle. Due to this, it is possible to further enhance the degree of freedom of an upper structure attached to vehicles.

DESCRIPTION OF EMBODIMENTS

Figure 1:
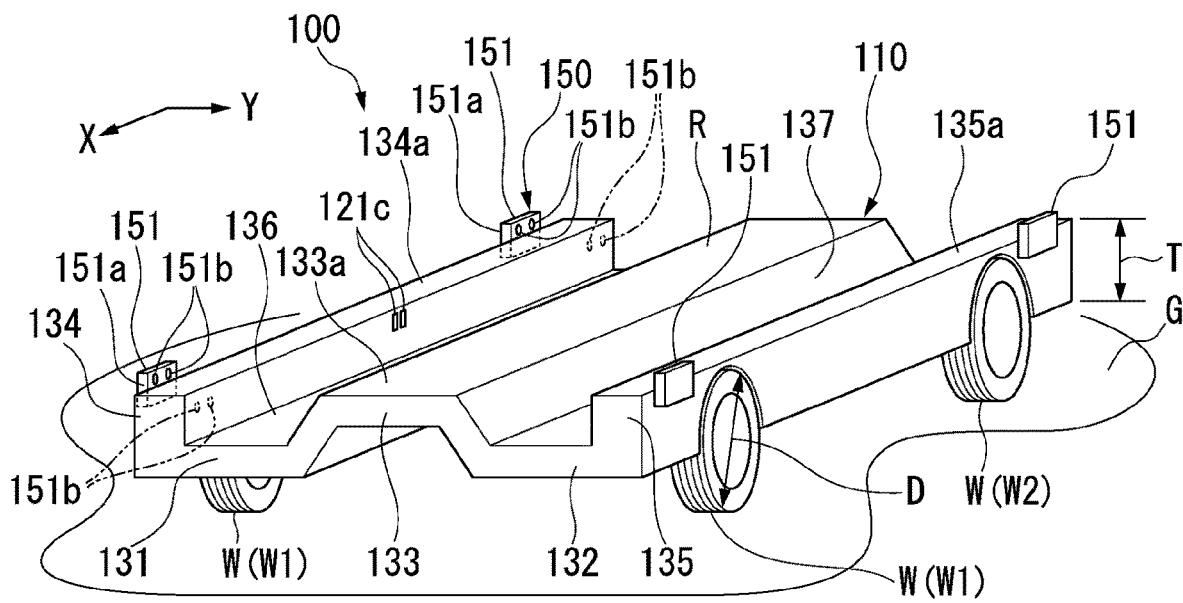
FIG. 1 is a perspective view illustrating an automated driving vehicle 100.

Hereinafter, an automated driving vehicle of the present invention will be described with reference to the drawings. The automated driving vehicle of the present invention is a vehicle which provide an automated driving function in a cart form to maximize the degree of freedom of an upper structure provided in the vehicle and provide versatility so that the vehicle can be utilized in various uses. In the embodiments illustrated below, an automated driving vehicle can change at least one of a shape and a function of an upper structure according to the use by switchably loading the upper structure, for example. An "automated driving vehicle" is an automated driving vehicle which basically does not require a driving operation, for example.

In the following description, components having the same or similar functions will be denoted by the same reference numerals. Redundant description of these components may be omitted in some cases. An expression "based on XX" means "based on at least XX", and also includes a case which is based on another element in addition to XX. The expression "based on XX" is not limited to a case where XX is directly used, but may also include a case which is based on something obtained by performing an operation or processing on XX. "XX" is an arbitrary element (for example, arbitrary information).

First Embodiment

[Overall Configuration of Automated Driving Vehicle]

Hereinafter, a first embodiment will be described. FIG. 1 is a perspective view illustrating an automated driving vehicle 100 of the present embodiment. In the first embodiment, a unit that does not include an upper structure 200 to be described later will be referred to as an "automated driving vehicle 100". On the other hand, a unit in which the automated driving vehicle 100 and the upper structure 200 are combined will be referred to as a "traveling object M" or a "mobile object M".

The automated driving vehicle 100 has a plate shape which does not have a passenger compartment, a seat, or the like. The "plate-shape" means a flat shape in a broad sense and is not limited to the meaning of a flat plate shape or a solid shape. For example, the "plate shape" also includes a case in which the shape has a bent or curved portion, a case in which the shape has a concave portion or a convex portion, and a case in which the shape has a hollow portion. The "plate shape" may be replaced with a "planar shape".

In the present embodiment, the automated driving vehicle 100 has a plate shape in which a largest height of the automated driving vehicle 100 from a ground surface G is equal to or smaller than 1.5 times a diameter D of a wheel W to be described later. In another viewpoint, the automated driving vehicle 100 has a plate shape in which a largest thickness (in the present embodiment, the same as a largest thickness of a traveling unit 110 to be described later) in a height direction of the automated driving vehicle 100 excluding the wheel W is equal to or smaller than the diameter D of the wheel W. Hereinafter, a configuration of such an automated driving vehicle 100 will be described in detail. In the following description, the automated driving vehicle 100 will be referred to simply as a "vehicle 100".

The vehicle 100 has the traveling unit 110 and a connecting mechanism 150, for example.

[Traveling Unit]

The traveling unit 110 is a plate-shaped traveling unit having an automated driving function and forms a main part of the vehicle 100. The traveling unit 110 has a plate shape which does not have a passenger compartment, a seat, and the like. For example, the traveling unit 110 has a plate shape in which a largest thickness T in the height direction of the traveling unit 110 excluding the wheel W is equal to or smaller than the diameter D of the wheel W. The traveling unit 110 is configured such that an upper structure 200 (see FIGS. 5 and 7 to 12) can be detachably attached thereto. The "attaching" means that the upper structure 200 is loaded on the traveling unit 110, for example, and includes a state in which the upper structure 200 is not fixed to the traveling unit 110.

As illustrated in FIG. 1, the traveling unit 110 has an attachment region R to which the upper structure 200 is detachably attached and a plurality of wheels W. The "attachment region R" will be described. The plurality of wheels W include a driving wheel driven by a drive force output device 116 to be described later. The traveling unit 110 is a traveling unit having four or more wheels W, for example, and may be a traveling unit having two or three wheels W like a motorcycle or other vehicles. The plurality of wheels W include a first wheel W1 and a second wheel W2. The second wheel W2 is positioned closer to a rear side than the first wheel W1 in a vehicle traveling direction X.

Figure 2:
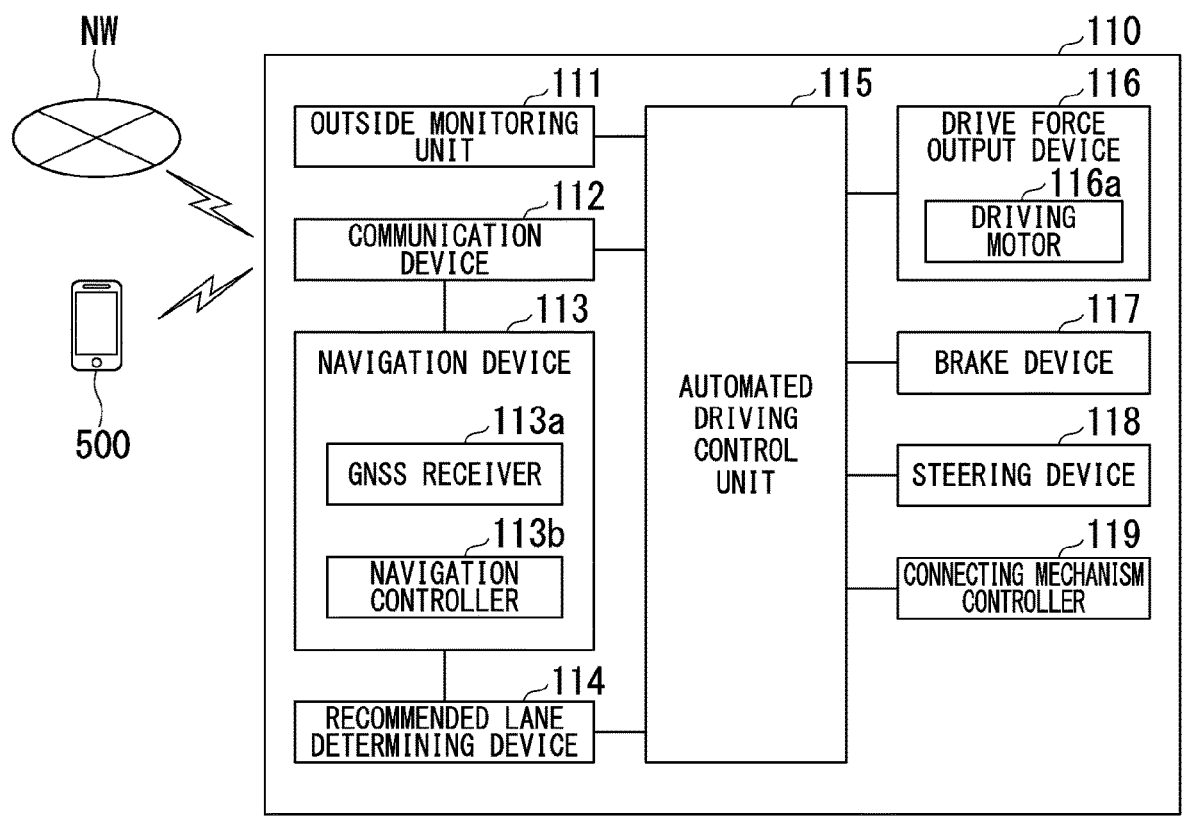
FIG. 2 is a block diagram illustrating a traveling unit 110.

FIG. 2 is a block diagram illustrating the traveling unit 110. The traveling unit 110 includes, for example, an outside monitoring unit 111, a communication device 112, a navigation device 113, a recommended lane determining device 114, an automated driving control unit 115, a drive force output device 116, a brake device 117, a steering device 118, a connecting mechanism controller 119, a power module 120 (see FIG. 6), an interface 121 (see FIG. 6), and a storage 122. In the following description, the vehicle 100 is sometimes referred to as a "host vehicle 100". The connecting mechanism controller 119 will be described later.

All or some of a navigation controller 113b of the navigation device 113, the recommended lane determining device 114, the automated driving control unit 115, and the connecting mechanism controller 119 may be realized when a processor such as a central processing unit (CPU) or the like executes a program (software) stored in a memory. All or some of the components may be realized by hardware such as a large scale integration (LSI), an application specific integrated circuit (ASIC), a field-programmable gate array (FPGA), or a graphics processing unit (GPU) and may be realized by the cooperation of software and hardware. The program may be stored in advance in a storage device such as a hard disk drive (HDD) or a flash memory and may be stored in a removable storage medium such as DVD or CD-ROM and be installed on a storage device when the storage medium is mounted on a drive device.

The outside monitoring unit 111 includes, for example, a camera, a radar, a light detection and ranging (LIDAR), and an object recognition device or the like that performs sensor fusion processing on the basis of the output of the camera, the radar, and the LIDAR. The outside monitoring unit 111 estimates the type (particularly, a vehicle, a pedestrian, and a bicycle) of an object present around the vehicle 100 and outputs the estimated type of the object to the automated driving control unit 115 together with the information of the position and the speed thereof.

The communication device (a wireless communicator) 112 is a wireless communication module for connecting to a network NW, communicating directly with a terminal device 500 of the user of the vehicle 100, and communicating directly with a terminal device or the like of an other vehicle or a pedestrian. The communication device 112 may communicate directly with a human machine interface (HMI) 202 (see FIG. 6) provided in the upper structure 200 via the communication device 201 of the upper structure 200 when a communication connector 121a and a gateway device 121b to be described later are not provided, for example. That is, the communication device 112 may acquire information (for example, information indicating an input operation on a driving operator 202a) input to the HMI 202 by wirelessly communicating with the communication device 201 of the upper structure 200. The communication device 112 performs wireless communication on the basis of Wi-Fi, dedicated short range communications (DSRC), Bluetooth (registered trademark, the same hereinbelow), and other communication standards. A plurality of communication devices corresponding to the uses may be prepared as the communication device 112. For example, the communication device 112 acquires an instruction (for example, an instruction related to a destination) related to travel the host vehicle 100 from the terminal device 500 (or the HMI 202 operated by a user) of the user. The communication device 112 is an example of an "acquirer". For example, the communication device 112 acquires information related to a destination of the host vehicle 100. The communication device 112 outputs the acquired information to the navigation device 113 and the automated driving control unit 115. The network NW includes the Internet, a wide area network (WAN), a local area network (LAN), a public line, a provider device, a dedicated line, a wireless base station, and the like. The terminal device 500 of the user is a smartphone, a tablet terminal, a personal computer, and the like, for example.

The navigation device 113 includes a global navigation satellite system (GNSS) receiver 113a, and a navigation controller 113b. The GNSS receiver 113a measures the position of a host device (the position of the host vehicle 100) on the basis of electric waves arriving from a GNSS satellite (for example, a GPS satellite). The navigation controller 113b includes a CPU and various storage devices, for example, and controls the entire navigation device 113. Map information (navigation map) is stored in the storage device. The navigation map is a map (map information including road information) that represents a road using a node and a link. The navigation controller 113b determines a route (a driving plan) from the position of the host vehicle 100 measured by the GNSS receiver 113a to a destination of the vehicle 100 acquired by the communication device 112 by referring to the navigation map. The navigation controller 113b is an example of a "driving plan generator". The navigation controller 113b may transmit the position and the destination of the host vehicle 100 to a navigation server (not illustrated) using the communication device 112 and acquire a route sent from the navigation server. The navigation controller 113b outputs information on the route determined or specified by any one of the above-described methods to the recommended lane determining device 114.

The recommended lane determining device 114 includes a micro processing unit (MPU) and various storage devices. High-accuracy map information more detail than the navigation map is stored in the storage device. The high-accuracy map information includes information such as a road width, a gradient, and a curvature of each lane and the positions of signals. The recommended lane determining device 114 determines a preferred recommended lane for traveling along a route input from the navigation device 113 and outputs the recommended lane to the automated driving control unit 115.

The automated driving control unit 115 includes one or more processors such as a CPU or an MPU and various storage devices. The automated driving control unit 115 is an example of an "automated driving controller". In the present embodiment, the automated driving control unit 115 also serves as a control unit that controls the entire traveling unit 110. The automated driving control unit 115 allows the traveling unit 110 to travel automatically so as to avoid contact with an object of which the position and the speed are input from the outside monitoring unit 111 basically while traveling along the recommended lane determined by the recommended lane determining device 114 basically. The automated driving control unit 115 executes events sequentially, for example. Examples of the event include a constant speed travel event in which a vehicle travels in the same traveling lane at a constant speed, a trailing travel event in which a vehicle follows a preceding vehicle, a lane changing event, a merging event, a diverging event, an emergency stop event, a toll booth event for passing through a toll booth and a handover event for ending automated driving and switching to manual driving. Moreover, during execution of these events, an avoidance action may be planned on the basis of a surrounding situation (the presence of a neighboring vehicle or a pedestrian or narrowing of lanes due to road construction) of the host vehicle 100.

The automated driving control unit 115 generates a target trajectory along which the host vehicle 100 will travel in the future. The target trajectory includes, for example, a speed element. For example, the target trajectory is represented by arranging positions (trajectory points) that the host vehicle 100 has to reach. The trajectory point is a position that the host vehicle 100 has to reach every predetermined traveling distance, and in addition to this, a target speed and a target acceleration every predetermined sampling period (for example, approximately every 0.x [sec]) are generated as a part of the target trajectory. The trajectory point may be a position that the host vehicle 100 has to reach at a predetermined sampling period. In this case, the information of the target speed and the target acceleration is represented by the interval of trajectory points.

Figure 3:
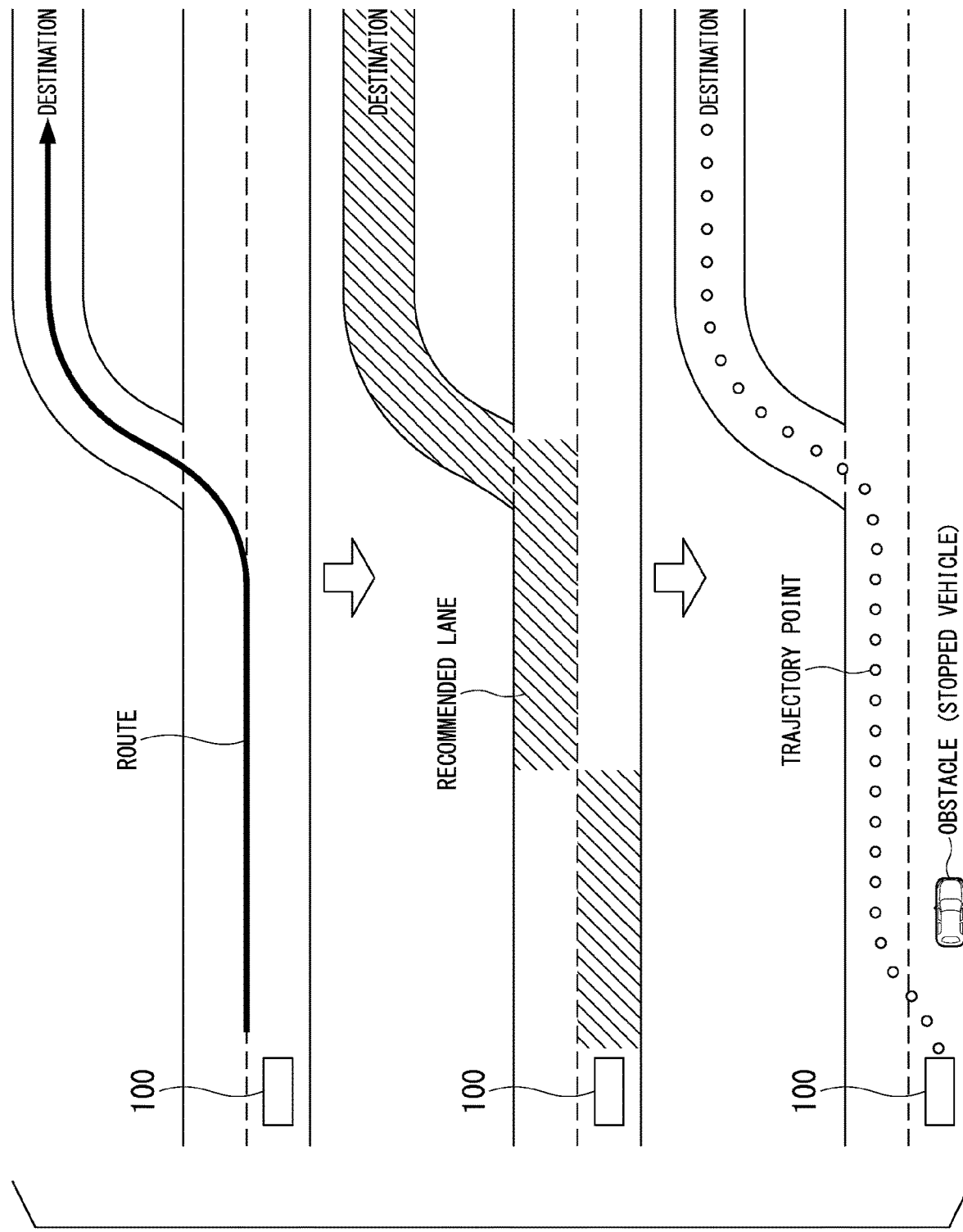
FIG. 3 is a diagram for describing a processing process of automated driving.

FIG. 3 is a diagram for describing a processing process of automated driving. First, as illustrated in the top drawing, a route is determined or specified by the navigation device 113. This route is a rough route in which lanes are not distinguished from each other, for example. Next, as illustrated in the middle drawing, the recommended lane determining device 114 determines a recommended lane in which the vehicle can easily travel along a route. As illustrated in the bottom drawing, the automated driving control unit 115 generates a trajectory point for traveling along a recommended lane as much as possible while performing obstacle avoidance or the like and controls some or all of the drive force output device 116, the brake device 117, and the steering device 118 so as to travel along the trajectory point (and an associated speed profile). Such role sharing is an example only, and the automated driving control unit 115 may perform processing in a unified manner, for example.

The drive force output device 116 outputs a traveling drive force (torque) for allowing the traveling unit 110 to travel to the wheel W. The drive force output device 116 is an example of a "driving source". The drive force output device 116 includes a combination of an internal combustion engine, an electric motor, and a transmission, and a power ECU that controls these components. In the present embodiment, the drive force output device 116 includes a driving motor 116a. The power ECU controls the above-described components according to information input from the automated driving control unit 115.

The brake device 117 includes, for example, a brake caliper, a cylinder that delivers hydraulic pressure to the brake caliper, an electric motor that generates hydraulic pressure in the cylinder, and a brake ECU. The brake ECU controls the electric motor according to the information input from the automated driving control unit 115 so that brake torque corresponding to a braking operation is output to each wheel. The brake device 117 may include a backup mechanism that delivers hydraulic pressure generated by an operation of a brake pedal included in a driving operator (for example, the driving operator 202a of the upper structure 200 to be described later) to a cylinder via a master cylinder. The brake device 117 is not limited to the above-described configuration but may be an electrically-controlled hydraulic-pressure brake device that controls an actuator according to the information input from the automated driving control unit 115 and delivers hydraulic pressure of the master cylinder to a cylinder.

The steering device 118 includes, for example, a steering ECU and an electric motor. The electric motor, for example, applies a force to a rack-and-pinion mechanism to change the direction of a steering wheel. The steering ECU drives an electric motor according to the information input from the automated driving control unit 115 or the information input from the driving operator to change the direction of the steering wheel.

Figure 6:
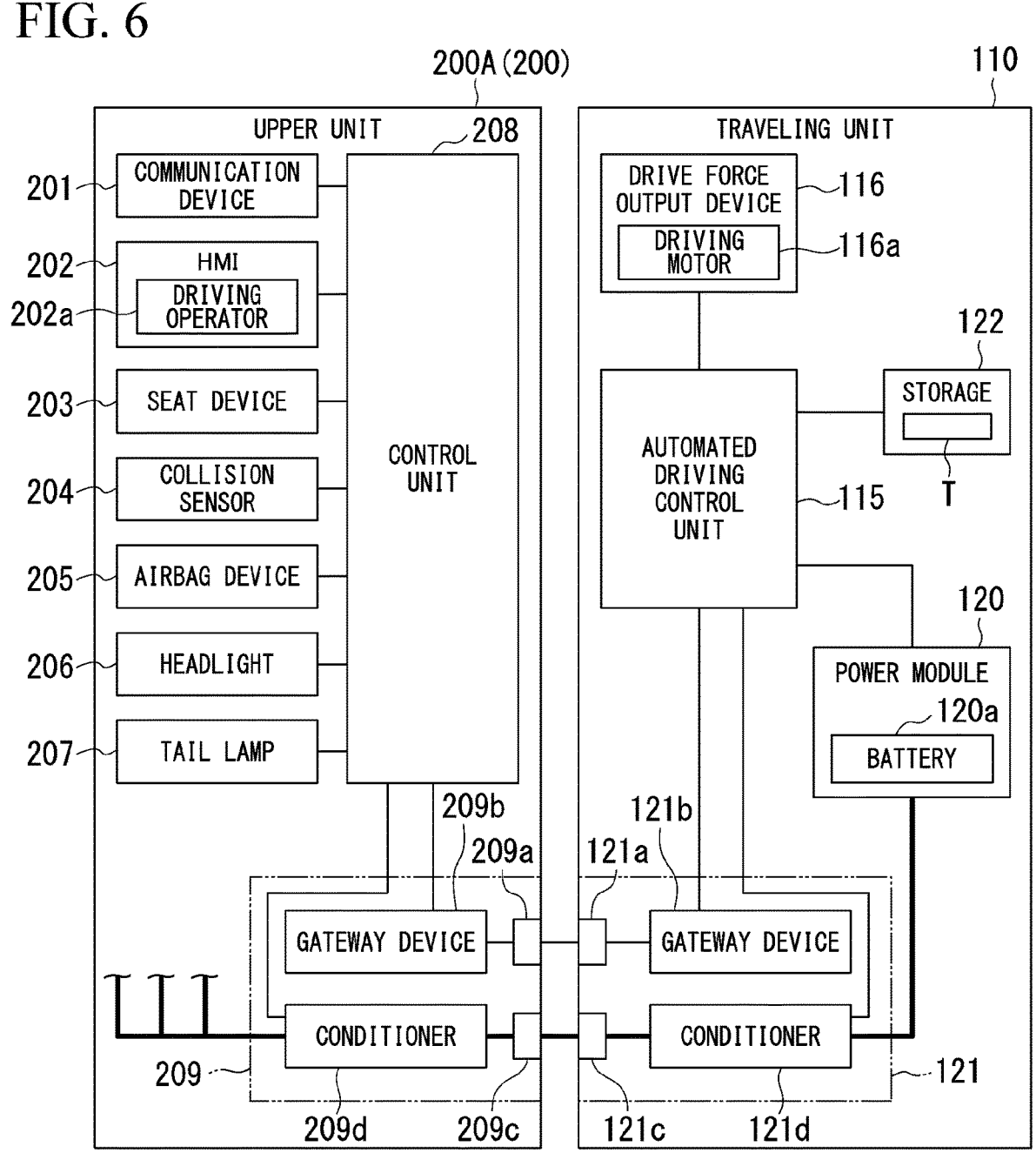
FIG. 6 is a block diagram illustrating the first upper unit 200A and the traveling unit 110.

As illustrated in FIG. 6, the power module 120 includes a battery 120a and a battery management unit (not illustrated) that controls the battery 120a. The power module 120 supplies electric power required for respective devices (the outside monitoring unit 111, the communication device 112, the navigation device 113, the recommended lane determining device 114, the automated driving control unit 115, the drive force output device 116, the brake device 117, the steering device 118, the connecting mechanism controller 119, and the like) of the traveling unit 110 from the battery 120a. That is, the respective devices of the traveling unit 110 operate by sharing part of the electric power supplied to the upper unit to be described later. The power module 120 supplies the electric power required for each device of the upper unit from the battery 120a via a power feeding connector 121c and a conditioner 121d of an interface 121 to be described later.

The interface 121 includes, for example, a communication connector 121a, a gateway device 121b, a power feeding connector 121c, and a conditioner (a power converter) 121d.

The power feeding connector 121c and the conditioner 121d of the interface 121 are examples of a "power supply interface" and the communication connector 121a and the gateway device 121b of the interface 121 are examples of a "first communication interface". Moreover, the communication connector 121a is an example of a "communication interface". The communication connector 121a is electrically connected to the gateway device 121b. The communication connector 121a is exposed to the outside of the traveling unit 110 and the communication connector 209a of the upper structure 200 can be physically and electrically connected thereto.

The gateway device 121b is an example of a "communication controller". The gateway device 121b can communicate with the upper structure 200 via the communication connector 121a. For example, the gateway device 121b communicates with the gateway device 209b of the upper structure 200. For example, the gateway device 121b performs collation and authentication between the upper structure 200 and the traveling unit 110 (for example, collation and authentication between the gateway device 121b and the gateway device 209b) on the basis of the control of at least one of the automated driving control unit 115 and the control unit 208 of the upper structure 200. Collation and authentication include, for example, a process of collating an ID (a transmission ID) allocated to a frame transmitted from one of the gateway device 121b and the gateway device 209b with information (for example, the information stored in the storage 122) stored in advance by the other one of the gateway device 121b and the gateway device 209b to thereby authenticate that a counterpart who transmitted the frame is an authorized counterpart. Collation and authentication include, for example, a process of the gateway device 121b collating an ID (a transmission ID) allocated to a frame transmitted from the gateway device 209b with information (for example, the information stored in the storage 122) stored in advance to thereby authenticate that the upper structure 200 having transmitted the frame is an authorized upper structure 200. The "authorized" means, for example, that the vehicle 100 and the upper structure 200 can be combined with each other (for example, the standards or the like match each other) or that the upper structure 200 belongs to a reliable owner (the upper structure 200 belongs to an owner registered in advance in a registration list).

For example, the gateway device 121b detects the type of the upper structure 200 connected to the interface 121 by the collation and authentication. The "type" includes a "format". For example, the gateway device 121b detects the type of the upper structure 200 connected to the interface 121 on the basis of the ID (transmission ID) allocated to the frame transmitted from the gateway device 209b and a correlation table T (a table in which a plurality of IDs and a plurality of upper structures 200 are correlated with each other) stored in the storage 122. The automated driving control unit 115 recognizes the function, the power consumption, and the like of the upper structure 200 on the basis of the content (for example, the type of the upper structure 200) authenticated by the gateway device 121b. Information indicating the functions, the power consumption, and the like of various upper structures 200 is stored in the storage 122 as a part of the table T, for example. The automated driving control unit 115 recognizes the function, the power consumption, and the like corresponding to the detected type of the upper structure 200 on the basis of the table T and the type of the upper structure 200, for example.

The gateway device 121b can acquire various pieces of information from the communication device 201, the HMI 202, a seat device 203, a collision sensor 204, an airbag device 205, and the control unit 208 of the upper structure 200 via the gateway device 209b of the upper structure 200. The gateway device 121b is another example of an "acquirer". For example, the gateway device 121b acquires information indicating an operation input to the driving operator 202a of the HMI 202 from the HMI 202 via the gateway device 209b of the upper structure 200. The gateway device 121b outputs the information acquired from the HMI 202 to the automated driving control unit 115. In this way, the automated driving control unit 115 can control the travel of the vehicle 100 on the basis of the information indicating the operation input to the driving operator 202a of the HMI 202.

The power feeding connector 121c is electrically connected to the battery 120a of the power module 120 via the conditioner 121d. The power feeding connector 121c is exposed to the outside of the traveling unit 110 and the power feeding connector 209c of the upper structure 200 can be physically and electrically connected thereto.

The conditioner 121d adjusts a power supply amount (for example, a voltage) to be output to the upper structure 200 through the power feeding connector 121c. The conditioner 209d is an inverter, for example, and may convert regenerative power output from a driving motor 116a to DC power, for example. For example, the conditioner 121d adjusts the power output from the power module 120 to power corresponding to the function, the power consumption, or the like of the upper structure 200 on the basis of the control of the automated driving control unit 115 and supplies the adjusted power to the upper structure 200.

The traveling unit 110 includes one or more interfaces 121 having the above-described function. For example, the traveling unit 110 includes a plurality of interfaces 121 having the above-described function. The plurality of interfaces 121 are divided and disposed in a plurality of locations of the traveling unit 110. According to such a configuration, the degree of freedom of the location or the like of a connector of the upper structure 200 is improved. Therefore, the versatility of the vehicle 100 is enhanced further.

The storage 122 is realized, for example, by a random access memory (RAM), a read only memory (ROM), a hard disk drive (HDD), a flash memory, or a hybrid storage device in which a plurality of these storages are combined.

Next, returning to FIG. 1, the attachment region R of the traveling unit 110 will be described. The attachment region R is a region to which the upper structure 200 can be attached (for example, mounted) and is a region in which the upper structure 200 can be supported from the lower side. In the present embodiment, the attachment region R is formed in a planar form extending approximately horizontally. The attachment region R forms a portion of the upper surface of the traveling unit 110. For example, the attachment region R forms the uppermost surface of the traveling unit 110. For example, the attachment region R is at a height position which is 1.5 times or smaller than the diameter D of the wheel W with respect to the ground surface G with which the wheel W makes contact.

In the present embodiment, the attachment region R has at least a size extending from approximately the same position as the first wheel W1 to approximately the same position as the second wheel W2 in the vehicle traveling direction X. For example, the attachment region R extends from a front-side position of the first wheel W1 to a rear-side position of the second wheel W2 in the vehicle traveling direction. In the present embodiment, the attachment region R extends over the entire length of the traveling unit 110 in the vehicle traveling direction X.

As illustrated in FIG. 1, in the present embodiment, the traveling unit 110 has a first base portion 131, a second base portion 132, a bulging portion 133, a first erection portion 134, and a second erection portion 135. The first base portion 131 and the second base portion 132 are disposed to be separated in a vehicle width direction Y with respect to the center of the vehicle 100. The bulging portion 133 is disposed between the first base portion 131 and the second base portion 132 and is positioned at an approximately central portion of the vehicle 100 in the vehicle width direction Y. The bulging portion 133 bulges upward in relation to the first base portion 131 and the second base portion 132.

The first erection portion 134 is positioned on the opposite side from the bulging portion 133 in relation to the first base portion 131. The first erection portion 134 is erected upward from an end of the first base portion 131. Due to this, a first concave portion 136 defined by the first erection portion 134, the first base portion 131, and the bulging portion 133 is formed between the first erection portion 134 and the bulging portion 133. Similarly, the second erection portion 135 is positioned on the opposite side from the bulging portion 133 in relation to the second base portion 132. The second erection portion 135 is erected upward from an end of the second base portion 132. Due to this, a second concave portion 137 defined by the second erection portion 135, the second base portion 132, and the bulging portion 133 is formed between the second erection portion 135 and the bulging portion 133.

In the present embodiment, the bulging portion 133 has a first flat surface 133a extending over an entire length of the traveling unit 110 in the vehicle traveling direction X. The first erection portion 134 has a second flat surface 134a extending over an entire length of the traveling unit 110 in the vehicle traveling direction X. The second erection portion 135 has a third flat surface 135a extending over an entire length of the traveling unit 110 in the vehicle traveling direction X. In the present embodiment, the first to third flat surfaces 133a, 134a, and 135a form the attachment region R.

[Connecting Mechanism]

Next, the connecting mechanism 150 will be described. The connecting mechanism 150 has one or more (for example, a plurality of) connectors 151. The plurality of connectors 151 are divided and disposed at a plurality of positions in the vehicle front-rear direction X and the vehicle width direction Y. Each connector 151 is connected to the upper structure 200 detachably attached to the traveling unit 110 and fixes the upper structure 200 to the traveling unit 110. The connectors 151 are an example of a "first connector."

Figure 4:
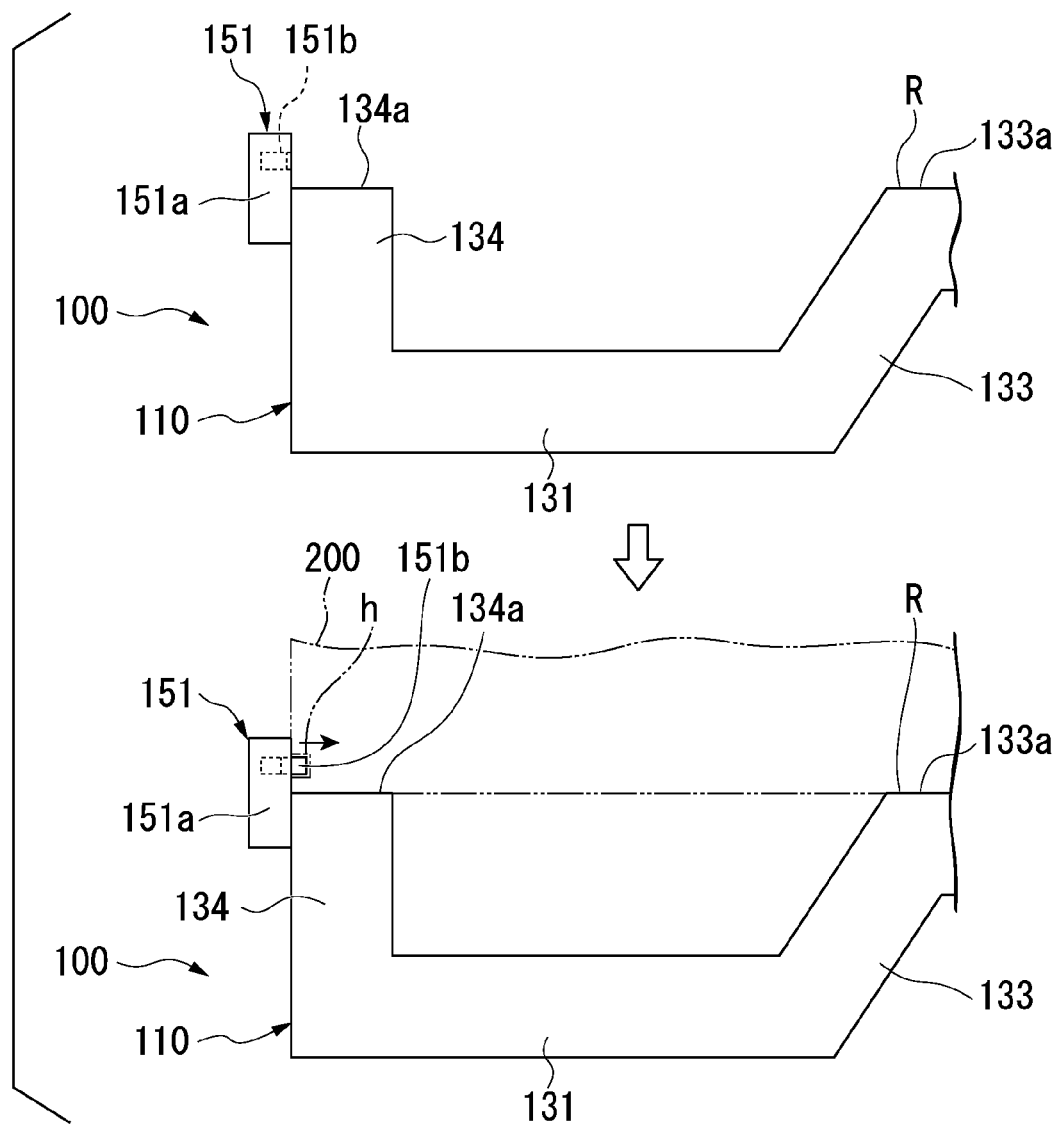
FIG. 4 is a front view illustrating an example of a connector 151.

FIG. 4 is a front view illustrating an example of one of the connectors 151. As illustrated in FIG. 4, the example of the connector 151 has a base 151a fixed to the traveling unit 110 and an engagement portion (movable portion) 151b that can move toward and away from the base 151a. The engagement portion 151b can move between a first position at which the engagement portion 151b enters the inner side of an engagement hole h formed in the upper structure 200 and engages with the engagement hole h and a second position at which the engagement portion 151b comes out of the engagement hole h. The connector 151 fixes the upper structure 200 to the traveling unit 110 when the engagement portion 151b moves to the first position. On the other hand, the connector 151 releases the fixed state of the upper structure 200 when the engagement portion 151b moves to the second position. The upper structure 200 can be detached from the traveling unit 110 in a state in which the fixing by the connector 151 is released. The connector 151 may have the engagement portion 151b only without the base 151a. In this case, the engagement portion 151b may be provided in the first erection portion 134 and the second erection portion 135 of the traveling unit 110 (see a two-dot chain line in FIG. 1). The connector 151 is not limited to the above-described example. The connector 151 is not limited to a specific structure as long as the connector 151 has a structure connected to the upper structure 200.

The connecting mechanism controller 119 operates the connector 151 on the basis of the control of the automated driving control unit 115, for example. That is, the connecting mechanism controller 119 switches the state of the vehicle 100 between a state in which the upper structure 200 is fixed to the traveling unit 110 and a state in which the upper structure 200 is detached from the traveling unit 110 by controlling the connector 151.

[Upper Structure]

Figure 5:
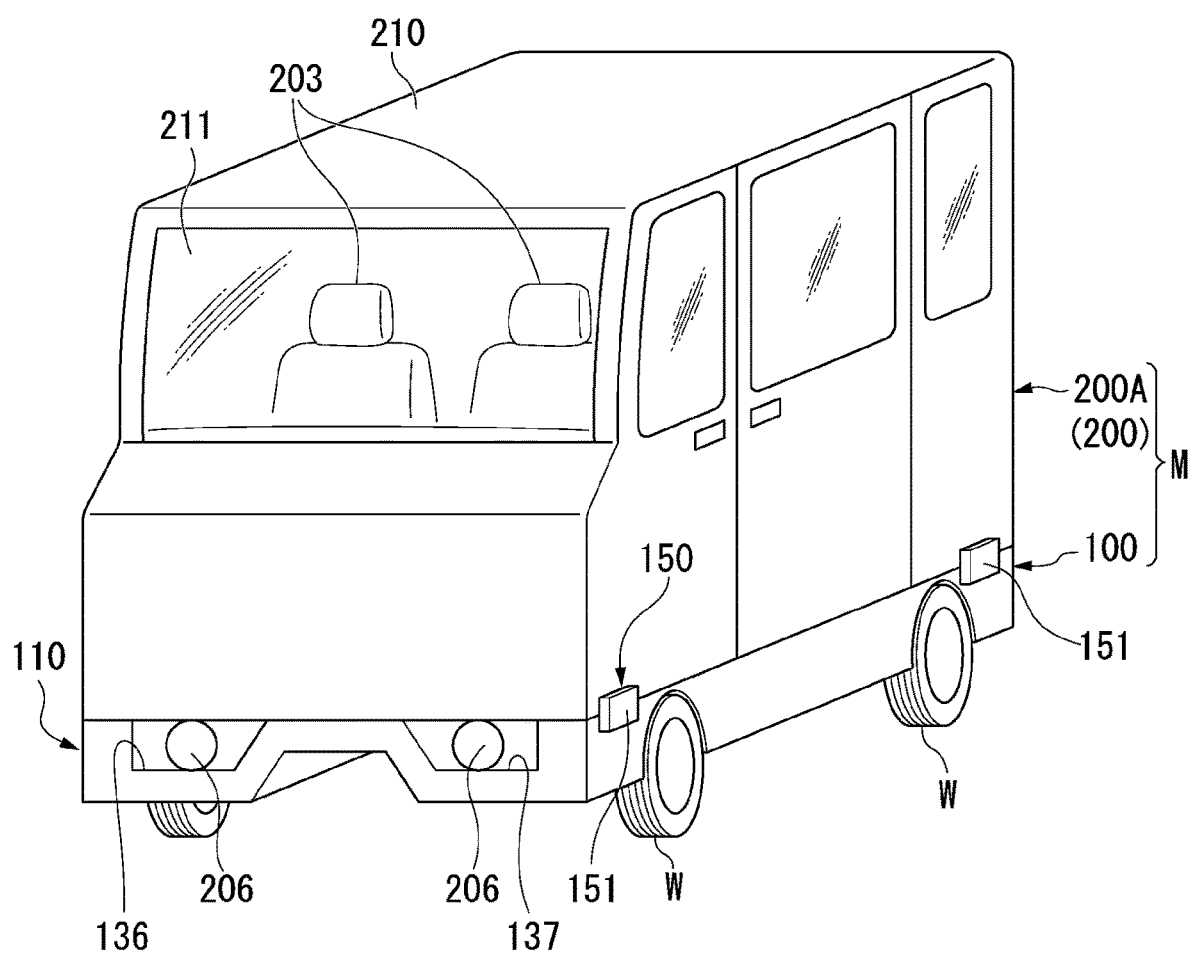
FIG. 5 is a perspective view illustrating a traveling object M including a first upper unit 200A.

Next, a first upper unit 200A which is an example of the upper structure 200 will be described. FIG. 5 is a perspective view illustrating a traveling object M including the first upper unit 200A. The first upper unit 200A is a unit which can provide functions similar to an ordinary passenger car to the vehicle 100. For example, the first upper unit 200A has a body 210 having a passenger compartment 211. The passenger compartment 211 is an example of a "room which an occupant can enter." The upper structure 200 has a size that covers the entire attachment region R of the traveling unit 110, for example.

FIG. 6 is a block diagram illustrating the first upper unit 200A and the traveling unit 110. In FIG. 6, only some functions of the traveling unit 110 are illustrated. As illustrated in FIG. 6, the first upper unit 200A has a communication device 201, an HMI 202, a seat device 203, a collision sensor 204, an airbag device 205, a headlight 206, a tail lamp 207, a control unit 208, and an interface 209.

The communication device (wireless communication unit) 201 is a wireless communication module for connecting to the network NW (see FIG. 2) and directly communicating with the communication device 112 of the vehicle 100, for example. The communication device 201 performs wireless communication on the basis of Wi-Fi, dedicated short range communications (DSRC), Bluetooth, or another communication standard. A plurality of communication devices corresponding to the uses may be prepared as the communication device 201.

The HMI 202 includes, for example, a driving operator (an operating device) 202a such as a steering wheel, an acceleration pad, and a brake pad for performing operations related to traveling of the vehicle 100 (for example, an auxiliary operation or an operation in a manual driving mode), a touch panel display device, a speaker, a microphone, and the like. Information (for example, information indicating an input operation on the driving operator 202a) input to the HMI 202 is transmitted via the gateway device 209b (or the communication device 201) and is acquired (received) by the gateway device 121b (or the communication device 112) of the vehicle 100.

The seat device 203 is provided in the passenger compartment 211 and an occupant can sit on the seat device 203. The collision sensor 204 is provided in the body 210 and detects a collision input to the body 210. The airbag device 205 operates on the basis of the detection result obtained by the collision sensor 204. The headlight 206 and the tail lamp 207 are accommodated in the first concave portion 136 and the second concave portion 137 of the traveling unit 110, for example. The headlight 206 and the tail lamp 207 may be provided as a part of the traveling unit 110 instead of being provided as a part of the upper structure 200. The communication device 201, the HMI 202, the seat device 203, the collision sensor 204, the airbag device 205, the headlight 206, and the tail lamp 207 are supplied with electric power from the battery 120a of the power module 120 of the traveling unit 110 when the power feeding connector 209c of the first upper unit 200A is connected to the power feeding connector 121c provided in the traveling unit 110.

The body 210, the communication device 201, the HMI 202, the seat device 203, the collision sensor 204, the airbag device 205, the headlight 206, and the tail lamp 207 are provided as modules, for example. These modules can be disposed at positions or in combinations desired by a user himself or herself, for example. One or more of these modules may be provided appropriately in second to sixth upper units 200B to 200F to be described later.

The control unit 208 controls the communication device 201, the HMI 202, the seat device 203, the collision sensor 204, the airbag device 205, the headlight 206, the tail lamp 207, and the interface 209. The control unit 208 may be realized by a processor such as a CPU executing a program (software) stored in a memory, may be realized by hardware such as an LSI, an ASIC, an FPGA, or a GPU, or may be realized by software and hardware in cooperation. The program may be stored in advance in a storage device such as an HDD or a flash memory and may be stored in a removable storage medium such as a DVD or CD-ROM and installed on a storage device when the storage medium is mounted in a drive device.

The interface 209 has, for example, a communication connector 209a, a gateway device 209b, a power feeding connector 209c, and a conditioner (power converter) 209d.

The communication connector 209a is an example of a "communication interface." The communication connector 209a is electrically connected to the gateway device 209b. The communication connector 209a can be physically and electrically connected to a communication connector 121a of the traveling unit 110 when the first upper unit 200A is attached to the traveling unit 110. That is, when the first upper unit 200A is attached to the traveling unit 110, the respective devices of the traveling unit 110 share part of the details of communication of the respective devices of the first upper unit 200A.

The gateway device 209b is an example of a "communication controller." The gateway device 209b can communicate with the gateway device 121b of the traveling unit 110 via the communication connector 209a. The gateway device 209b performs collation and authentication between the upper structure 200 and the traveling unit 110 (for example, collation and authentication between the gateway device 121b and the gateway device 209b) on the basis of the control of at least one of the automated driving control unit 115 and the control unit 208 of the upper structure 200. Collation and authentication include, for example, a process of the gateway device 209b collating an ID (a transmission ID) allocated to a frame transmitted from the gateway device 121b with information stored in advance to thereby authenticate that the vehicle 100 having transmitted the frame is an authorized vehicle 100. For example, the gateway device 209b detects the type of the traveling unit 110 connected to the interface 209 by the collation and authentication. For example, the gateway device 209b detects the type of the traveling unit 110 connected to the interface 209 on the basis of the ID (transmission ID) allocated to the frame transmitted from the gateway device 121b.

The power feeding connector 209c is electrically connected to various devices of the first upper unit 200A via the conditioner 209d. The power feeding connector 209c is exposed to the outside of the first upper unit 200A and the power feeding connector 121c of the traveling unit 110 can be physically and electrically connected thereto.

The conditioner 209d adjusts the electric power supplied from the traveling unit 110 through the power feeding connector 209c to a desired power supply amount (for example, a voltage) for various devices of the first upper unit 200A. For example, the conditioner 209d adjusts the power supplied from the traveling unit 110 to power corresponding to the function, the power consumption, or the like of various devices of the first upper unit 200A on the basis of the control of the control unit 208 and supplies the adjusted power to various devices of the first upper unit 200A. Any one of the conditioner 121d of the traveling unit 110 and the conditioner 209d of the upper structure 200 may be omitted.

Here, one or more upper structures 200 can be switchably loaded on the traveling unit 110 of the present embodiment instead of the first upper unit 200A. Hereinafter, another example of the upper structure 200 attached to the traveling unit 110 instead of the first upper unit 200A will be described. However, the shape and the function of the upper structure 200 attachable to the traveling unit 110 are not limited to the example to be described later.

Figure 7:
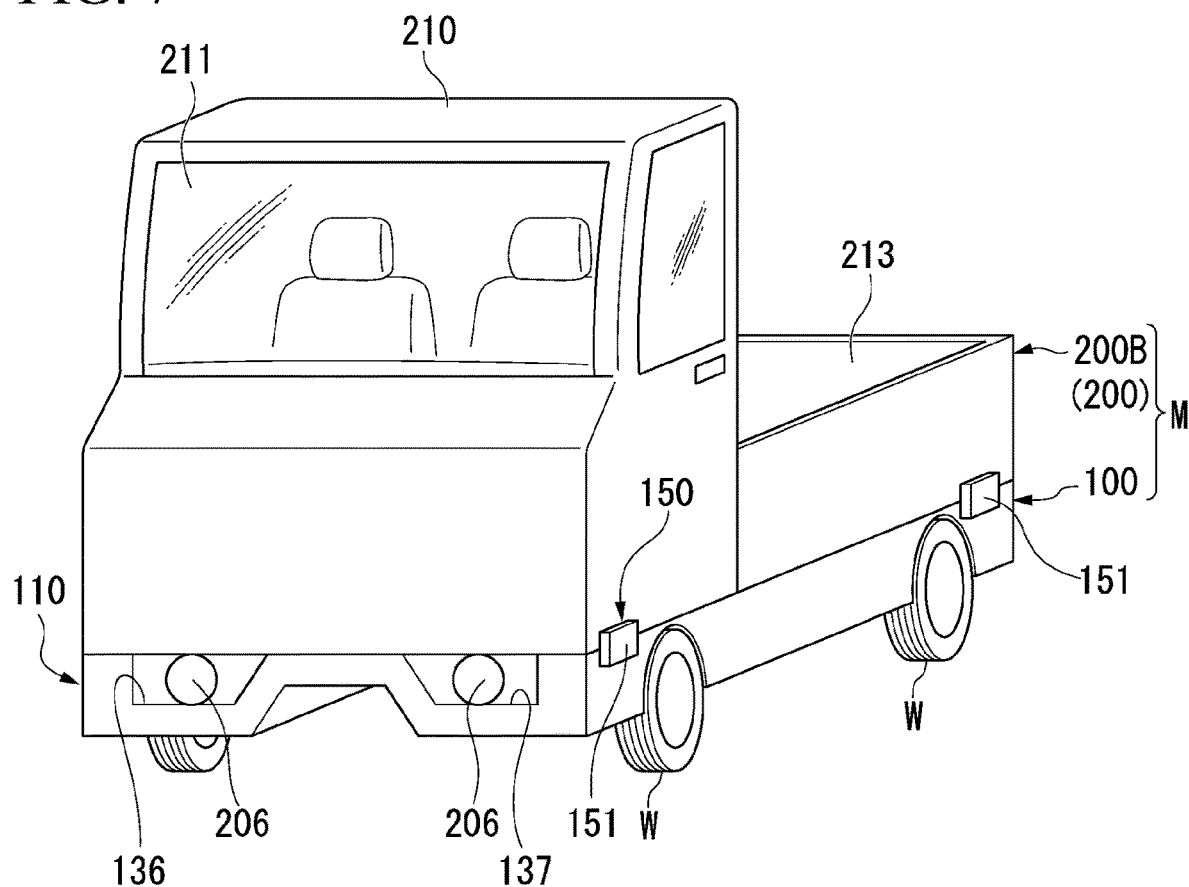
FIG. 7 is a perspective view illustrating a traveling object M including the second upper unit 200B.

FIG. 7 is a perspective view illustrating a traveling object M including a second upper unit 200B which is another example of the upper structure 200. The second upper unit 200B is a unit which can provide functions similar to an ordinary truck to the vehicle 100. For example, the second upper unit 200B has a body 210 having a passenger compartment 211 and a luggage compartment 213. The luggage compartment 213 is an example of a "luggage support capable of supporting luggage." Other configurations of the second upper unit 200B are approximately the same as those of the first upper unit 200A.

Figure 8:
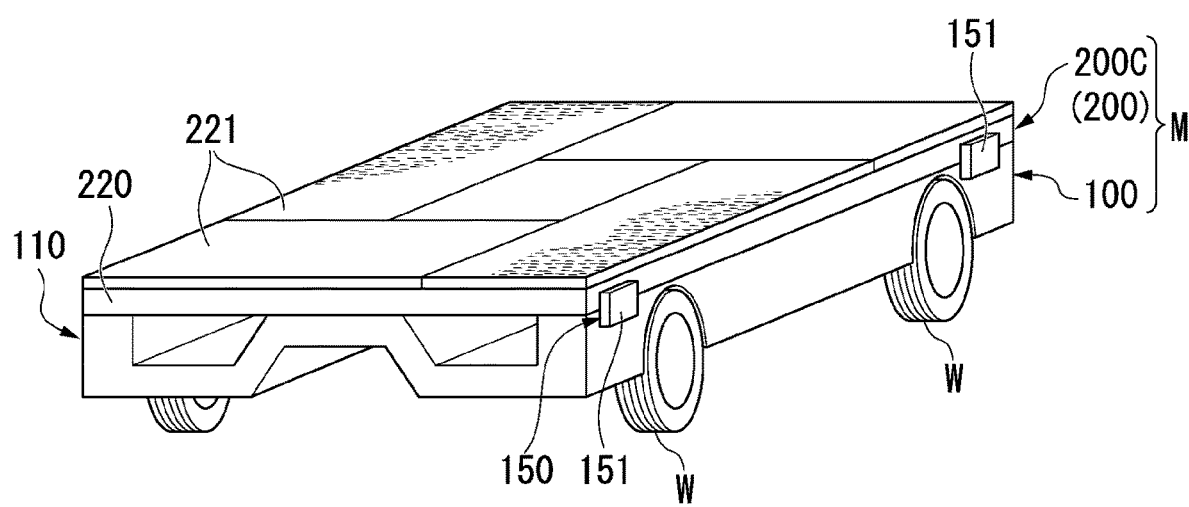
FIG. 8 is a perspective view illustrating a traveling object M including a third upper unit 200C.

FIG. 8 is a perspective view illustrating a traveling object M including a third upper unit 200C which is another example of the upper structure 200. The third upper unit 200C is a unit which can provide a recreation function to the vehicle 100. For example, the third upper unit 200C does not have a compartment, and the top and four sides are open. The third upper unit 200C has a base 220 fixed to the traveling unit 110 by the connecting mechanism 150 and a plurality of mats 221 attached to the base 220. The third upper unit 200C travels on private land and private roads, for example A user can enjoy cherry-blossom viewing or sightseeing using the third upper unit 200C.

Figure 9:
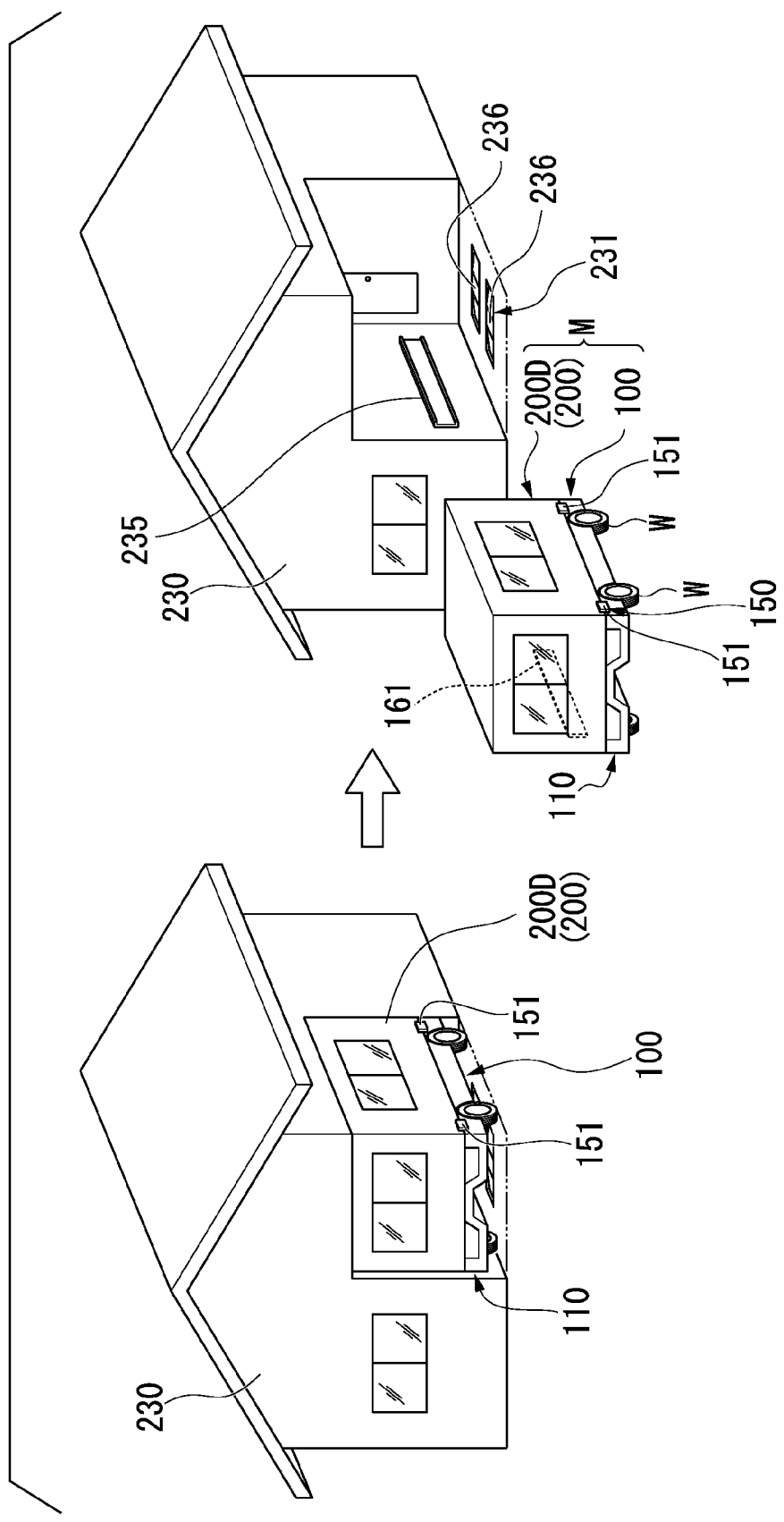
FIG. 9 is a perspective view illustrating a traveling object M including a fourth upper unit 200D.
Figure 10:
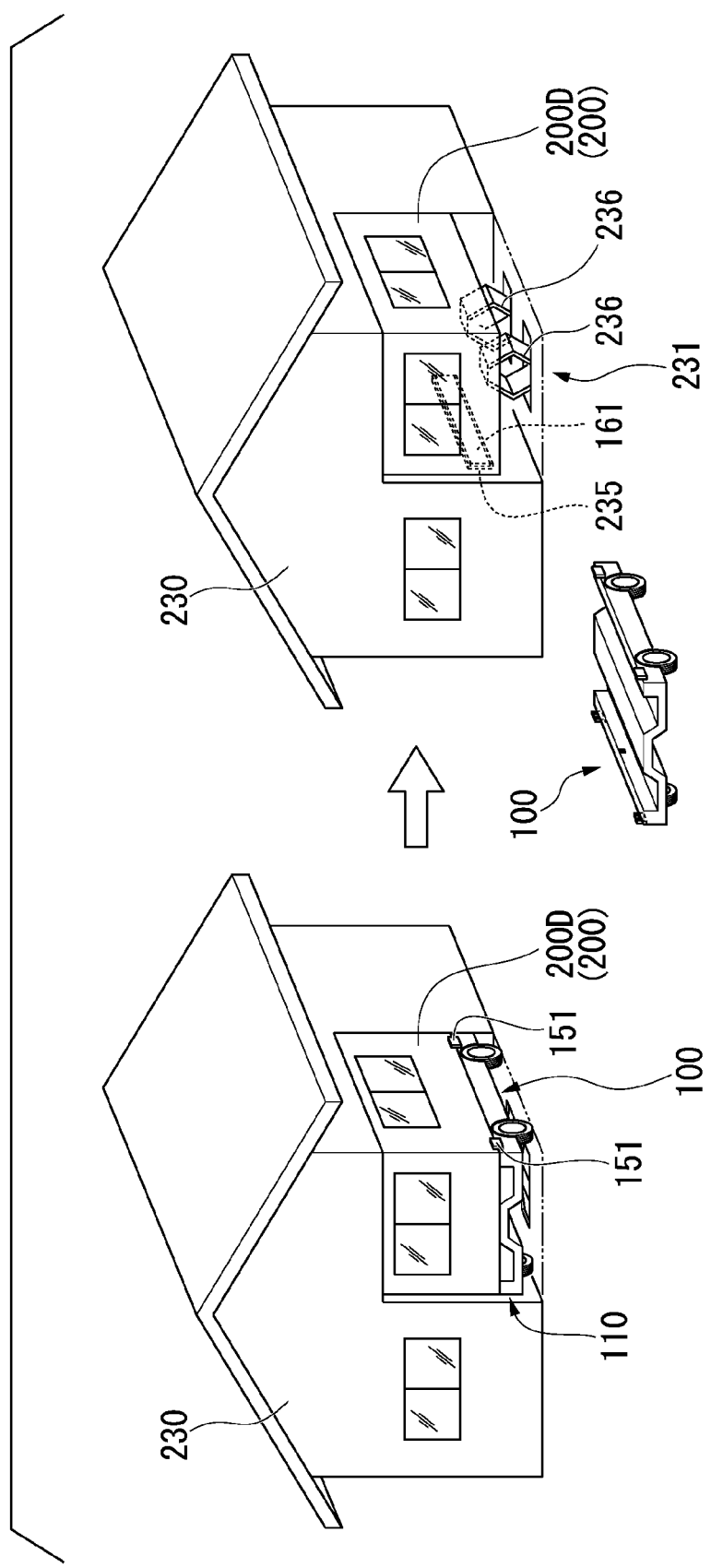
FIG. 10 is a perspective view illustrating a traveling object M including the fourth upper unit 200D.

FIGS. 9 and 10 are perspective views illustrating a traveling object M including a fourth upper unit 200D which is another example of the upper structure 200. The fourth upper unit 200D is a unit which is a part of a structure 230 (a house, a building, or the like). In other words, the vehicle 100 provides a traveling function to a part of the structure 230 when a part of the structure 230 is connected thereto. A user can move to another place while living and working in the structure 230 using the fourth upper unit 200D.

For example, as illustrated in FIG. 9, the fourth upper unit 200D can move while connected to the vehicle 100 and loaded on the vehicle 100. On the other hand, as illustrated in FIG. 10, the fourth upper unit 200D and the vehicle 100 can be separated from each other. In this case, the vehicle 100 can move while separated from the fourth upper unit 200D in a state in which the fourth upper unit 200D is left in the structure 230. The vehicle 100 can be connected to the fourth upper unit 200D again by moving toward the lower side of the fourth upper unit 200D from a state in which it is separated from the fourth upper unit 200D.

In the present embodiment, the structure 230 includes a supporting structure 231 that supports the fourth upper unit 200D left in the structure 230 from at least one of a lateral side and a lower side when the vehicle 100 moves with the fourth upper unit 200D left in the structure 230. As illustrated in FIG. 9, the supporting structure 231 has a rail 235 and a support 236, for example.

The rail 235 is provided on a lateral surface of the structure 230. The fourth upper unit 200D has an engagement member 161 supported by the rail 235 from a lateral side and a lower side. The engagement member 161 enters the inner side of the rail 235 and is supported by the rail 235, whereby the fourth upper unit 200D is supported by the structure 230.

The support 236 is disposed in a region positioned on the lower side of the fourth upper unit 200D when the fourth upper unit 200D is connected to the structure 230. The support 236 supports the fourth upper unit 200D from the lower side instead of the vehicle 100 when the vehicle 100 moves while separated from the fourth upper unit 200D with the fourth upper unit 200D left in the structure 230. For example, the support 236 is formed of a column or a jack of which the upper end supporting the fourth upper unit 200D from the lower side can move in a height direction. For example, the support 236 is accommodated in an accommodation portion provided in the ground surface G, for example, so as not to make contact with the vehicle 100 when the vehicle 100 is positioned on the lower side of the fourth upper unit 200D. On the other hand, the support 236 moves toward the upper side to make contact with the fourth upper unit 200D and support the fourth upper unit 200D from the lower side when the vehicle 100 moves with the fourth upper unit 200D left in the structure 230.

Figure 11:
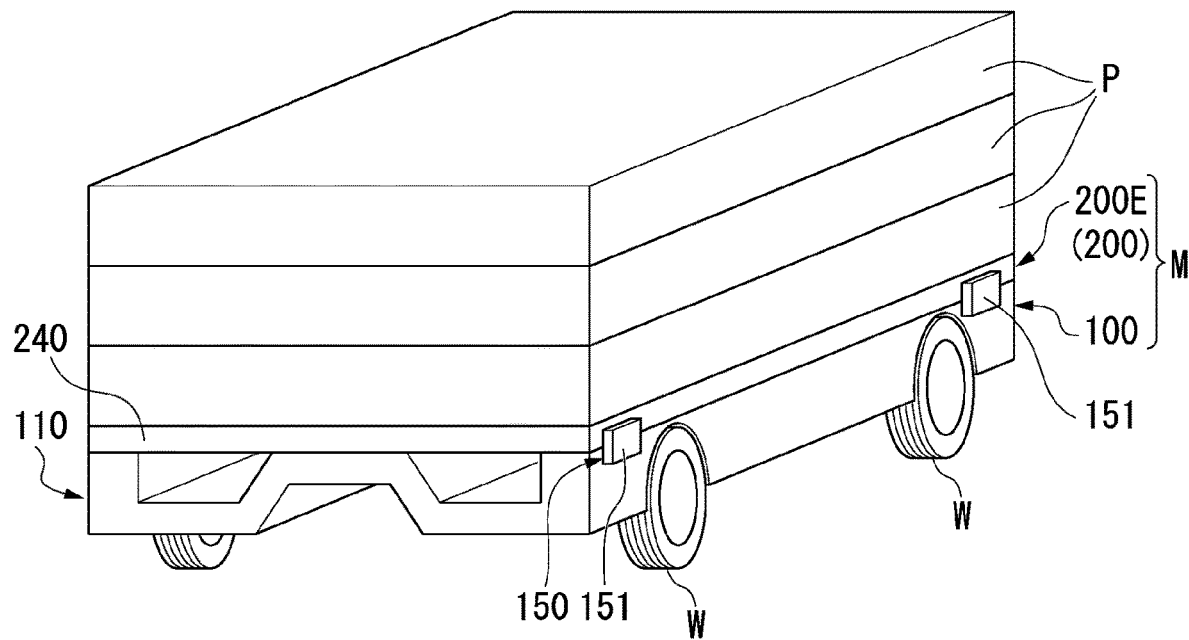
FIG. 11 is a perspective view illustrating a traveling object M including a fifth upper unit 200E.

FIG. 11 is a perspective view illustrating a traveling object M including a fifth upper unit 200E which is another example of the upper structure 200. The fifth upper unit 200E is a unit which can provide function of a load carrying device to the vehicle 100. The fifth upper unit 200E includes a palette 240 fixed to the traveling unit 110 by the connecting mechanism 150. The palette 240 is another example of a "luggage support capable of supporting luggage." A plurality of loads P are loaded on the palette 240 and fixed to the palette 240 by a fixing member (not illustrated). A user can convey one or more loads P in a plant, a load collection place, and other workplaces using the fifth upper unit 200E.

Figure 12:
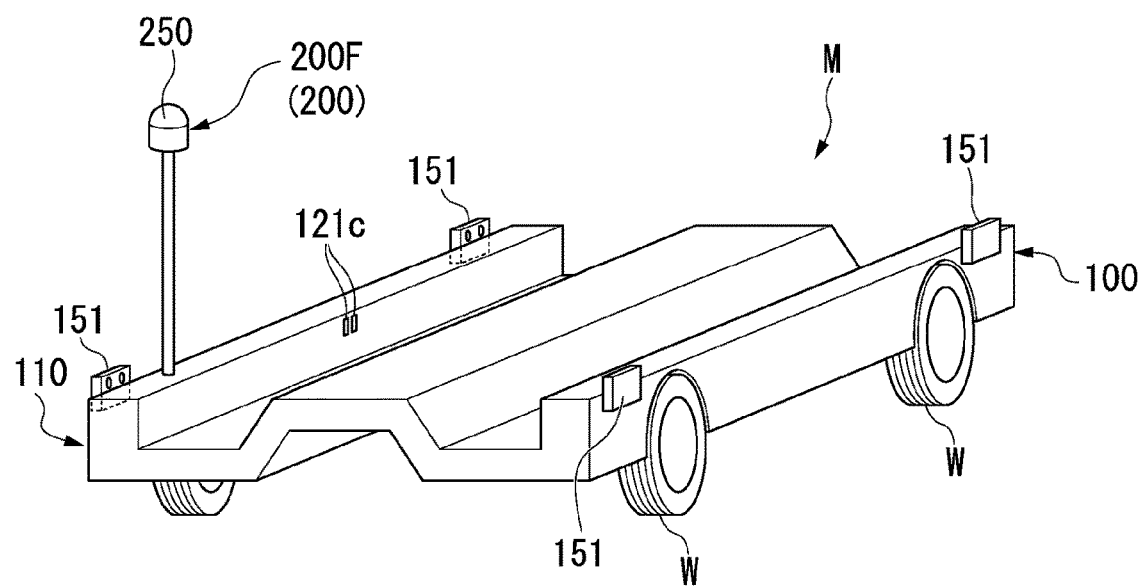
FIG. 12 is a perspective view illustrating a traveling object M including a sixth upper unit 200F.

FIG. 12 is a perspective view illustrating a traveling object M including a sixth upper unit 200F which is another example of the upper structure 200. The sixth upper unit 200F is a unit which can provide functions of a surveillance device to the vehicle 100. The sixth upper unit 200F includes a sensor unit 250 fixed to the traveling unit 110. The sensor unit 250 includes a camera and a communication device capable of transmitting images and videos captured by the camera to a server or the like of a management center. The vehicle 100 can move along a designated route with the sensor unit 250 attached thereto. A user can patrol (detect abnormalities in) an arbitrary location using the sixth upper unit 200F.

According to the configuration of the first embodiment described above, it is possible to provide the vehicle 100 which can be used for a plurality of uses. That is, in the present embodiment, the vehicle 100 to which an arbitrary upper structure 200 can be attached is provided. Due to this, independent development by many business operators can be allowed, and a broad and deep range of functions specialized for respective uses can be provided.

In the first embodiment, the traveling unit 110 can customize the functions of the vehicle 100 by switchably mounting a plurality of upper structures 200. According to such a configuration, the vehicle 100 can function as a passenger car or a truck in a day-time period and can function as the traveling object M for another use such as a conveying palette having an automated driving function in a plant or the like in a night-time period (a resting period in a daytime use).

Modification of First Embodiment

Figure 13:
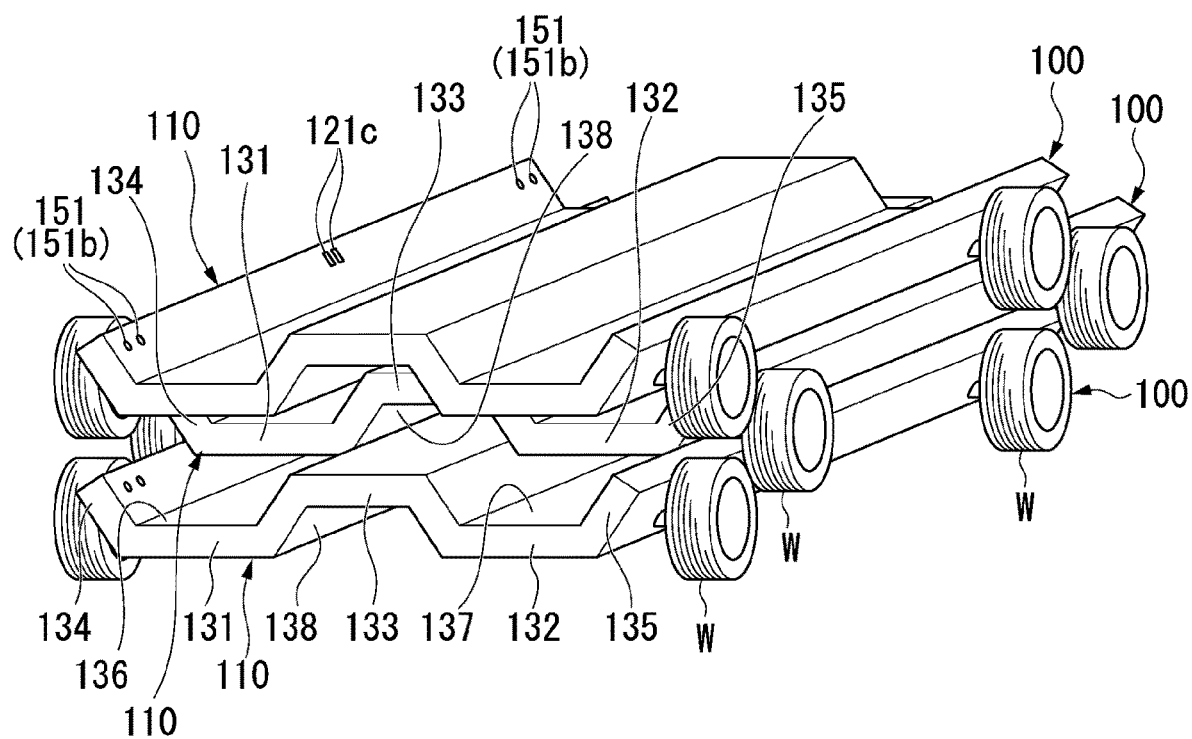
FIG. 13 is a perspective view illustrating a first modification of the automated driving vehicle 100.

Hereinafter, a first modification of the vehicle 100 which is one of modifications of the first embodiment described above will be described. FIG. 13 is a perspective view illustrating a first modification of the vehicle 100. As illustrated in FIG. 13, in the present modification, a vehicle 100 positioned on the lowermost side can travel in a state in which one or more other vehicles 100 are loaded on one vehicle 100 from an upper side.

In the present modification, the first erection portion 134 and the second erection portion 135 are inclined obliquely in a vertical direction so as to be positioned on the outer side in the vehicle width direction Y as the erection portions advance upward, for example. At least a portion of the first base portion 131 and the second base portion 132 of the traveling unit 110 of a vehicle 100 immediately above the vehicle 100 on the lowermost side among the plurality of vehicles 100 overlapping in the height direction is accommodated in the first concave portion 136 and the second concave portion 137 of the traveling unit 110 of the vehicle 100 on the lowermost side. The lower surface of the bulging portion 133 of each traveling unit 110 forms a third concave portion 138 depressed toward the upper side. At least a portion of the bulging portion 133 of the traveling unit 110 of the vehicle 100 on the lowermost side among the plurality of vehicles 100 overlapping in the height direction is accommodated in the third concave portion 138 formed by the bulging portion 133 of the traveling unit 110 of the vehicle 100 immediately thereabove.

In this way, the overlapping thickness of the plurality of vehicles 100 is decreased.

From another viewpoint, the bulging portion 133 of the traveling unit 110 of the vehicle 100 on the lowermost side supports the vehicle 100 immediately thereabove from the lower side by making contact with the traveling unit 110 of the vehicle 100 immediately thereabove. The bulging portion 133 is an example of a "support" that supports the traveling unit 110 of the vehicle 100 immediately thereabove. The inner surface (a surface forming a portion of the first concave portion 136 and the second concave portion 137) of the first erection portion 134 and the second erection portion 135 of the traveling unit 110 of the vehicle 100 on the lowermost side supports the vehicle 100 immediately thereabove from the lower side by making contact with the traveling unit 110 of the vehicle 100 immediately thereabove. Each of the first erection portion 134 and the second erection portion 135 is another example of a "support" that supports the traveling unit 110 of the vehicle 100 immediately thereabove.

The traveling unit 110 of the vehicle 100 on the lowermost side has the wheels W in contact with the ground surface G and can travel with a plurality of vehicles 100 loaded thereon. For example, the traveling unit 110 of the vehicle 100 on the lowermost side is electrically connected to the battery 120a of the traveling unit 110 of the vehicle 100 loaded thereon via the terminal 121 or the like. Due to this, the traveling unit 110 of the vehicle 100 on the lowermost side can travel using the electric power supplied from the battery 120a of the traveling unit 110 of one or more other overlapping vehicles 100.

The structure for overlapping the plurality of vehicles 100 is not limited to the above-described example. For example, the first erection portion 134 and the second erection portion 135 may be erected in a vertical direction. The plurality of vehicles 100 may be just stacked in the height direction.

Figure 14:
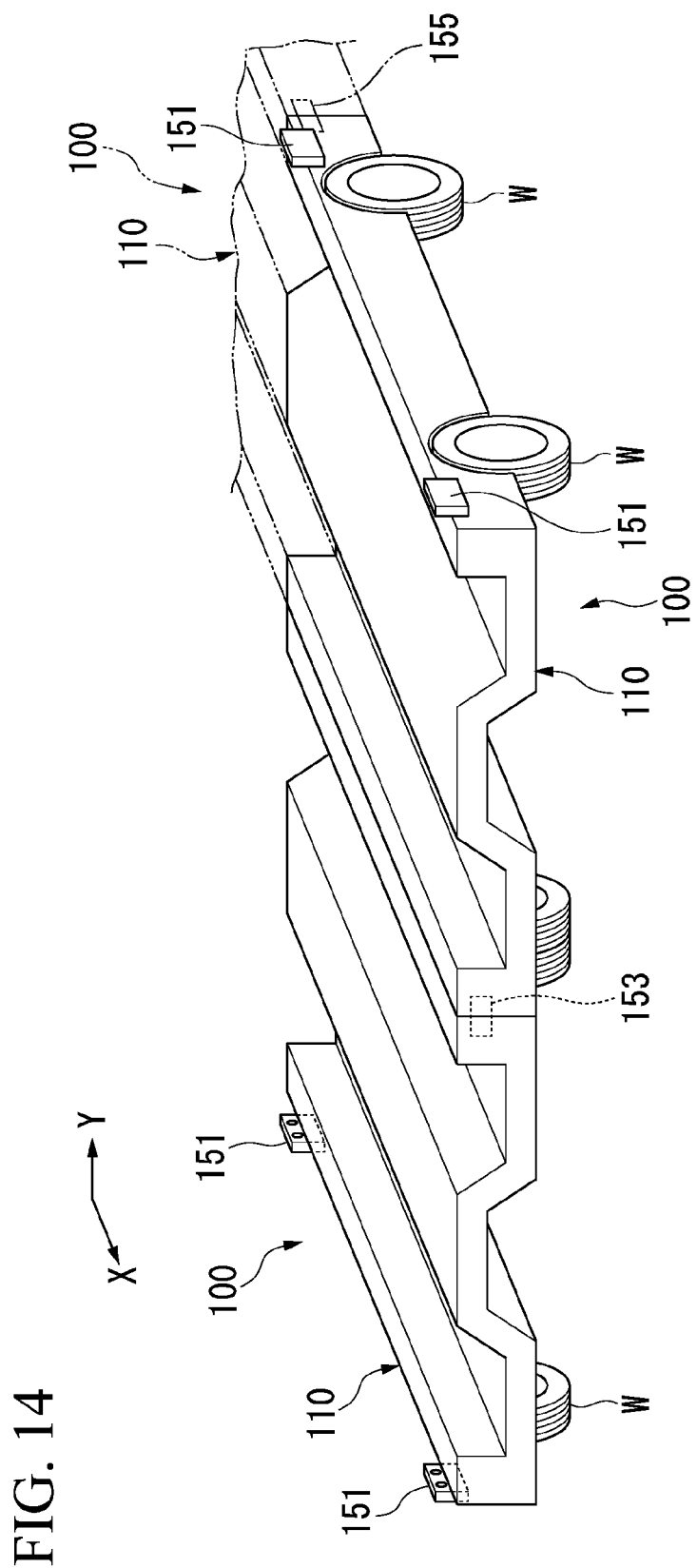
FIG. 14 is a perspective view illustrating a second modification of the automated driving vehicle 100.

Hereinafter, a second modification of the vehicle 100 which is one of modifications of the first embodiment described above will be described. FIG. 14 is a perspective view illustrating a second modification of the vehicle 100. As illustrated in FIG. 14, in the present modification, the traveling unit 110 of the vehicle 100 has a connector 153 and a connector 155. The traveling unit 110 may have only one of the connector 153 and the connector 155.

One connector 153 is a connector connected to the traveling unit 110 of another vehicle 100 arranged in the vehicle width direction Y with respect to the traveling unit 110. When the connector 153 is connected to the traveling unit 110 of the other vehicle 100, the plurality of vehicles 100 are fixed together. In this way, the plurality of vehicles 100 can travel integrally. The connector 153 is an example of a "second connector". The traveling unit 110 may be connected to the traveling unit 110 of another vehicle 100 in a state in which one wheel W of the traveling unit 110 is removed, and may be connected to the traveling unit 110 of the other vehicle 100 in a state in which the wheel W of the traveling unit 110 is not removed.

The other connector 155 is a connector connected to the traveling unit 110 of another vehicle 100 arranged in the vehicle traveling direction X with respect to the traveling unit 110. When the connector 155 is connected to the traveling unit 110 of the other vehicle 100, a plurality of vehicles 100 are fixed together. In this way, the plurality of vehicles 100 can travel integrally. The connector 155 is another example of a "second connector".

According to the configuration of the modifications of the first embodiment described above, the upper structure 200 has a size extending over a plurality of vehicles 100 connected to each other. That is, the plurality of vehicles 100 are connected by the connector 153 or the connector 155 whereby the upper structure 200 having a size which cannot be supported in one vehicle 100 can be supported. In this way, it is possible to further enhance the degree of freedom of the upper structure 200.

Figure 15:
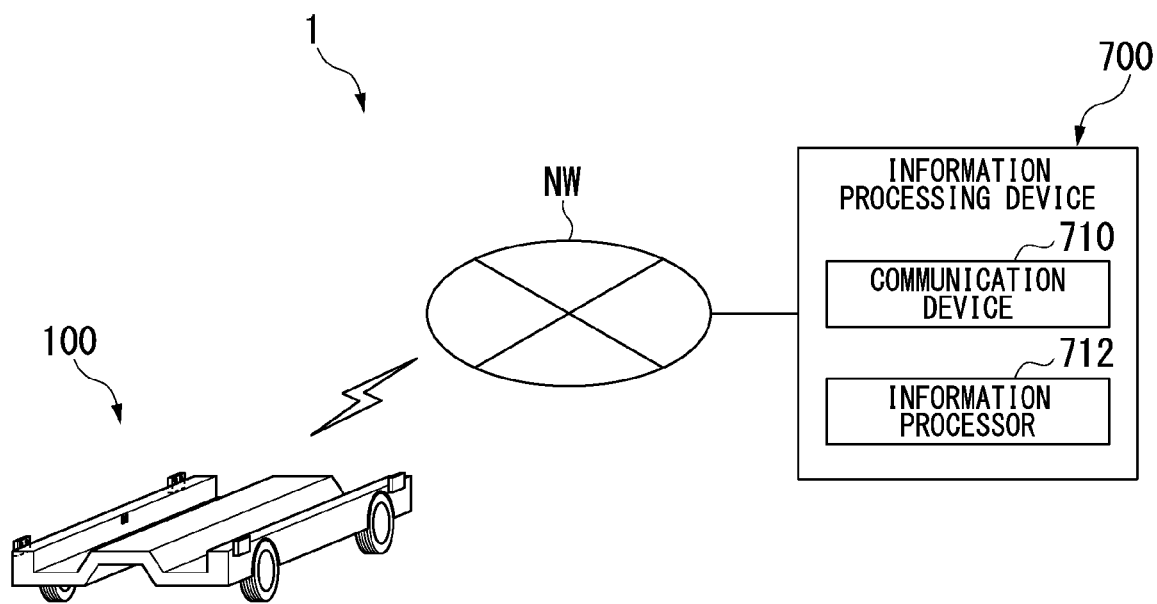
FIG. 15 is a block diagram illustrating an example of a vehicle use system 1.

While the first embodiment and a plurality of modifications of the first embodiment have been described, the configuration of the embodiment is not limited to the above-described examples. For example, the vehicle 100 may be used by such a vehicle use system 1 as illustrated in FIG. 15. That is, the vehicle use system 1 includes one or more information processing devices 700 disposed outside the vehicle 100. The information processing devices 700 has a communicator 710 that can communicate with the vehicle 100 and the terminal device 500 of a user via the network NW, for example, and an information processor 712. The information processor 712 may have some or all of the respective functional units (for example, the navigation controller 113b, the recommended lane determining device 114, and the automated driving control unit 115) included in the traveling unit 110 of the vehicle 100. The information processor 712 may be realized by a processor such as a CPU executing a program (software) stored in a memory, may be realized by hardware such as an LSI, an ASIC, an FPGA, or a GPU, and may be realized by cooperation of software and hardware.

In the first embodiment described above, a vehicle 100 having a size similar to an ordinary passenger car or truck has been described as the vehicle 100. However, the size of the vehicle 100 is not limited to the above example. The size of the vehicle 100 may be approximately the size of a bed, for example, and may be a size still smaller than the bed.

Second Embodiment

Figure 16:
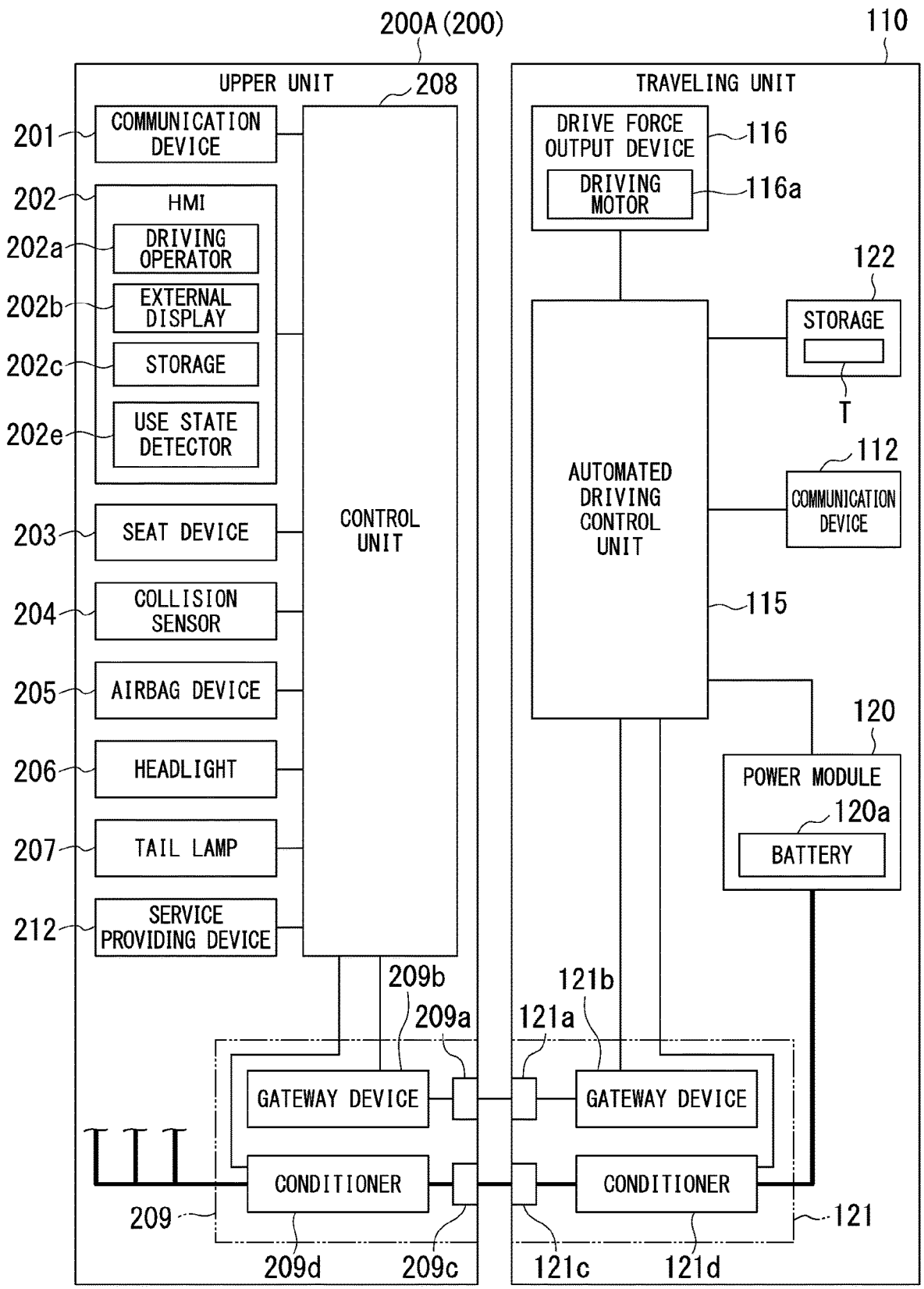
FIG. 16 is a block diagram illustrating a first upper unit 200A and a traveling unit 110 according to a second embodiment.

Hereinafter, a second embodiment will be described. FIG. 16 is a block diagram illustrating a first upper unit 200A and a traveling unit 110 of the second embodiment. As in the illustrated example, the HMI 202 of the first upper unit 200A of the second embodiment includes an external display 202b, a storage 202c, and a use state detector 202e in addition to the driving operator 202a. The first upper unit 200A of the second embodiment further includes a service providing device 212.

The external display 202b is an organic electro luminescence (EL) display attached to the surface of an outer body of the vehicle 100, for example. The external display 202b may be a liquid crystal display (LCD) fitted to the body and may be a display panel which forms a part or an entire part of the body. Moreover, the external display 202b may be a movable display device having a driving unit. In this case, the external display 202b is accommodated in a position in which the display surface is not visible from the outside of the vehicle when the external display 202b does not display contents such as a still image or a moving image and is moved by the driving unit to a position at which the display surface is visible from the outside of the vehicle when the external display 202b displays contents. Furthermore, the external display 202b may be a light-transmitting liquid crystal panel formed in at least a portion of a front windshield, a side windshield, or a rear windshield of the vehicle 100.

Figure 17:
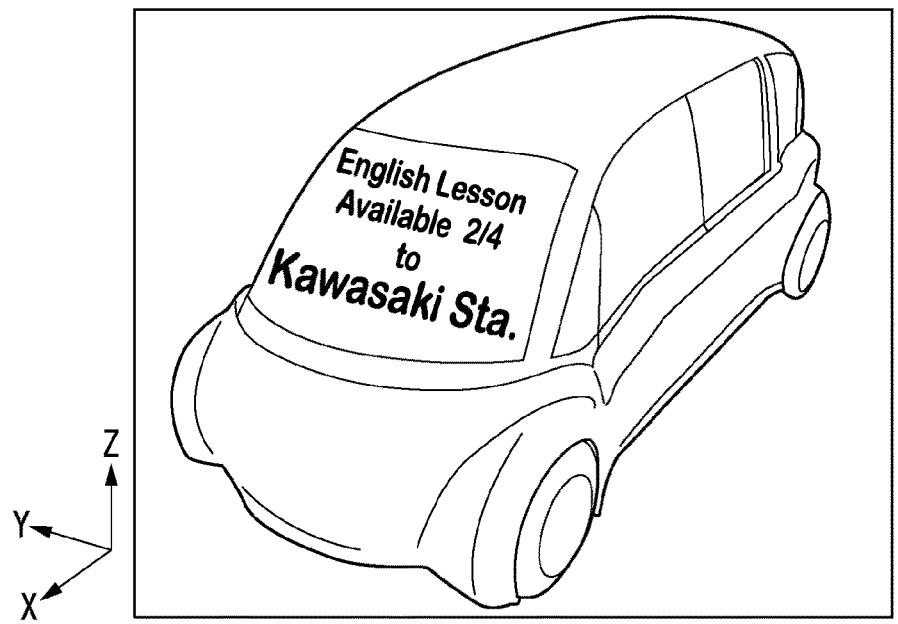
FIG. 17 is a diagram illustrating an example of an external display 202b.
Figure 18:
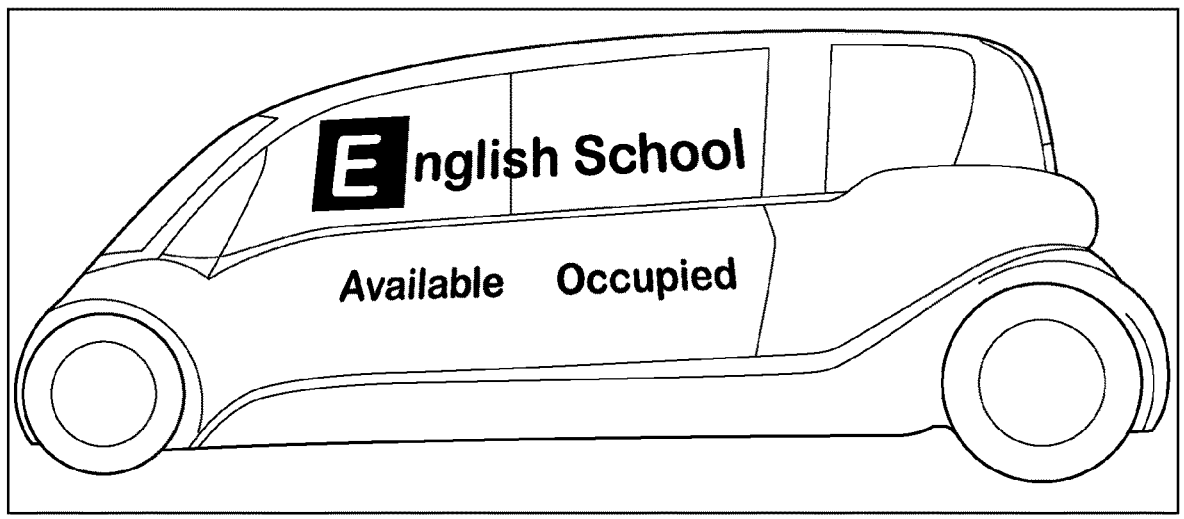
FIG. 18 is a diagram illustrating an example of the external display 202b.

FIGS. 17 and 18 are diagrams illustrating an example of the external display 202b. As illustrated in FIGS. 17 and 18, for example, a trademark or a logo indicating a service provided via the vehicle 100, the details (in the illustrated example, an English conversation school) of the service, a destination of the vehicle 100, and information (information indicating whether a user outside the vehicle can enter the vehicle 100 and can use the service) indicating an availability state of the service are displayed in the external display 202b.

Returning to FIG. 16, the storage 202c is realized by a storage device such as, for example, RAM, ROM, HDD, and a flash memory. Firmware (driver) and the like acquired from an external device (an application server or the like), for example, are stored in the storage 202c. The firmware is a program (software) for controlling respective devices connected to the control unit 208 such as the communication device 201, the HMI 202, the seat device 203, the collision sensor 204, the airbag device 205, and the service providing device 212 (hereinafter these devices will be referred to as accessories). The firmware is an example of "control information of accessories". The firmware stored in the storage 202c may be updated periodically or non-periodically. Moreover, identification information for identifying respective accessories may be stored in the storage 202c.

The use state detector 202e detects a use state of each compartment of the vehicle 100 on the basis of the presence or the position of a user boarding on the vehicle 100 or a load. A compartment is a space in the upper structure 200 of the vehicle 100 and is a space which a user can enter or in which a load can be loaded. The use state detector 202e may detect the use state of the compartment on the basis of the detection results obtained by a load sensor and an in-vehicle camera (which are not illustrated).

The service providing device 212 is a device provided by a service provider (a service owner) who uses the inside and the outside of the vehicle 100 for services. For example, the service providing device 212 outputs a video or a conversation voice of a third person, displays an advertisement on the external display 202b, and transmits information to a terminal device (for example, a smartphone or the like) of a user present in a compartment in order to provide the compartment of the vehicle 100 as a service providing place such as an English conversation classroom.

The control unit 208 transmits various pieces of information to the traveling unit 110. For example, the control unit 208 controls the gateway device 209b to transmit information indicating the connection state of accessories connected thereto (the control unit 208) to the gateway device 121b of the traveling unit 110. The information indicating the connection state of the accessories may include information of the firmware and the identification information of accessories, for example. The gateway device 209b is an example of a "second communication interface".

The control unit 208 may control the communication device 201 to transmit the information indicating the connection state of accessories to the communication device 112 of the traveling unit 110. The communication device 201 is another example of a "second communication interface".

When the terminal device 500 of a user is wirelessly connected to the service providing device 212 via Wi-Fi, Bluetooth, or the like, the control unit 208 may transmit the information indicating the connection state of accessories to the communication device 112 of the traveling unit 110 via the terminal device 500 connected to the service providing device 212. The terminal device 500 connected to the service providing device 212 is another example of a "second communication interface".

When the information indicating the connection state of the accessories is transmitted to the traveling unit 110 via wireless communication, an external server device may be provided between the first upper unit 200A and the traveling unit 110. The server device performs collation and authentication performed between the gateway device 121b and the gateway device 209b instead of the gateway device 121b and the gateway device 209b.

Upon receiving the information indicating the connection state of the accessories from the control unit 208, the gateway device 121b or the communication device 112 of the traveling unit 110 outputs the information to the automated driving control unit 115. The automated driving control unit 115 may authenticate that the upper structure 200 is an authorized upper structure 200 on the basis of the information indicating the connection state of the accessories output by the gateway device 121b or the communication device 112, for example.

When an external server device is provided between the first upper unit 200A and the traveling unit 110, the communication device 112 of the traveling unit 110 may receive information indicating the results of collation and authentication performed by the server device. In this case, the automated driving control unit 115 may authenticate that the upper structure 200 is an authorized upper structure 200 on the basis of the results of collation and authentication performed by the server device.

According to the configuration of the second embodiment described above, similarly to the first embodiment, it is possible to provide the vehicle 100 which can be used in a plurality of uses. Due to this, independent development by many business operators can be allowed, and a broad and deep range of functions specialized for respective uses can be provided.

Third Embodiment

Figure 19:
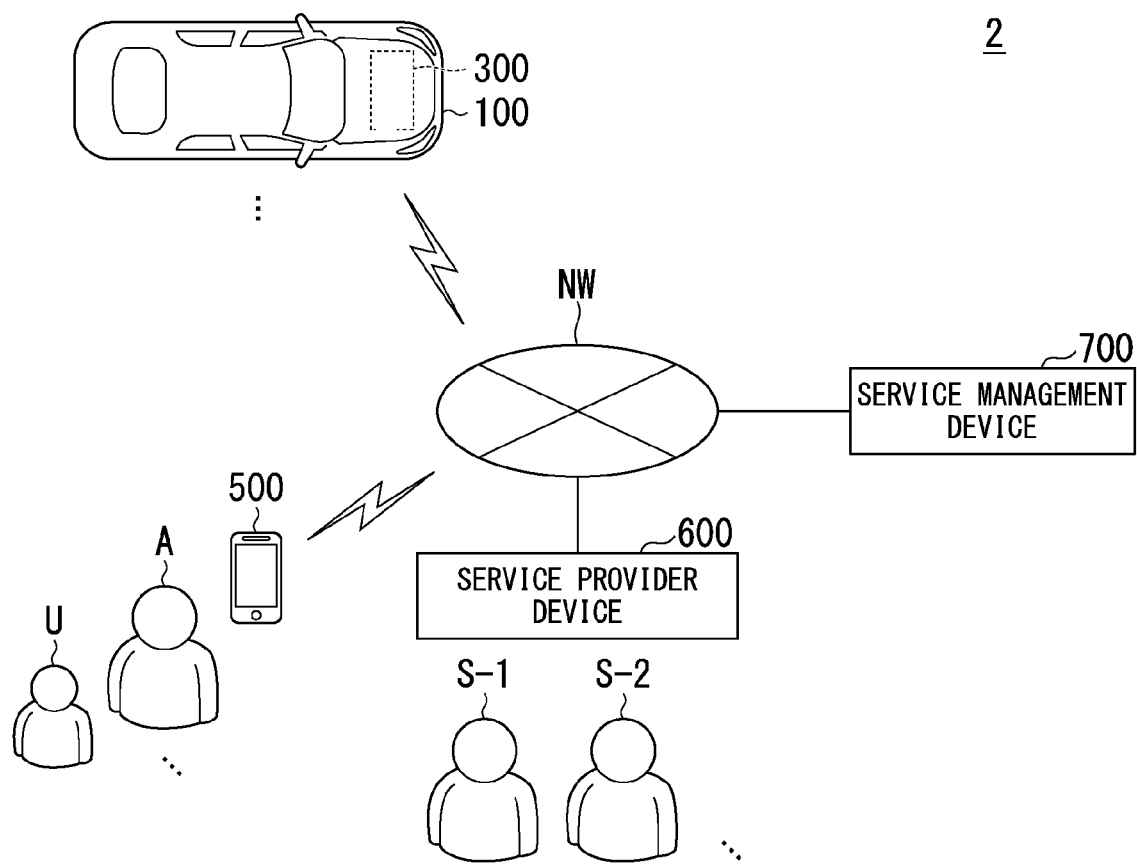
FIG. 19 is a block diagram of a service providing system 2 including a vehicle 100 (an automated driving vehicle 100) according to a third embodiment.

Hereinafter, a third embodiment will be described. FIG. 19 is a block diagram of a service providing system 2 including the vehicle 100 (an automated driving vehicle 100) according to the third embodiment. The service providing system 2 includes one or more vehicles 100, a plurality of terminal devices 500, a service provider device 600, and a service management device 700. The plurality of terminal devices 500 include a terminal device 500a used by a service provider S and a terminal device 500b used by a service applicant A. These components can communicate with each other via the network NW. The service of the service provider S is provided to a service user U. Although the service applicant A and the service user U are illustrated to be different persons in the drawing, the applicant and the user may be the same person. The term "used by the service applicant A" may include a situation in which a terminal device which can be used by many and unspecified persons such as a terminal device in an Internet café, for example, is temporarily used by the service applicant A.

Figure 20:
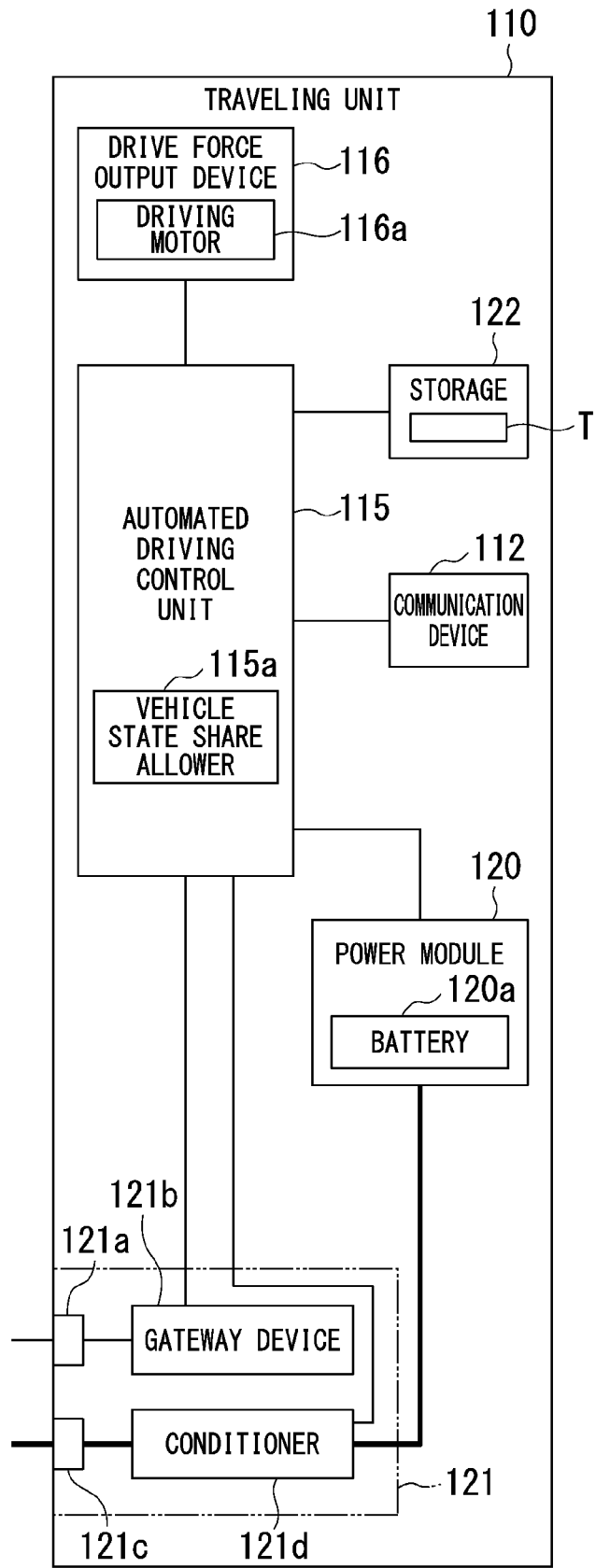
FIG. 20 is a diagram illustrating an example of a configuration of a traveling unit 110 according to the third embodiment.

FIG. 20 is a diagram illustrating an example of a configuration of the traveling unit 110 according to the third embodiment. The automated driving control unit 115 of the traveling unit 110 according to the third embodiment includes a vehicle state sharing allower 115a.

The vehicle state sharing allower 115a allows the information of the traveling unit 200A to be shared with an accessory connected to the first upper unit 200A or the terminal device 500 connected to the accessory (the service providing device 212 or the like) on the basis of the identification information of the accessory connected to the first upper unit 200A and the firmware update information acquired from the service management device 700. The identification information of the accessory may be acquired by the communication device 112 of the traveling unit 110 receiving the identification information stored in the storage 202c of the control unit 208, for example. Moreover, the firmware update information may be acquired by the communication device 112 of the traveling unit 110 receiving the identification information stored in the storage 800 of the service management device 700. Moreover, the vehicle state sharing allower 115a may allow the information of the traveling unit 200A to be shared with the first upper unit 200A or the terminal device 500 specified on the basis of the identification information (the upper unit ID) of the first upper unit 200A on the basis of the identification information of the accessory connected to the first upper unit 200A and the firmware update information acquired from the service management device 700.

[Terminal Device]

The terminal device 500 is a smartphone, a tablet terminal, a personal computer, or the like, for example. The terminal device 500 is activated by an application program for using the service providing system 2, a browser, or the like to support services to be described later. In the following description, it is assumed that the terminal device 500 is a smartphone and an application program (a service applicant application) is activated. The service user application communicates with the service management device 700 according to an operation of the service applicant A to transmit a request from the service applicant A to the service management device 700 and send a push notification based on information received from the service management device 700. The service management device 700 is another example of an "information processing device" described in the first embodiment.

The terminal device 500 (500a and 500b) transmits service use request information including the following content to the service management device 700, for example. Position information is measured by a GPS receiver included in the terminal device 500, for example. The other information is basically based on the information input by the service applicant A or the service user U. Desired use service provider attribute information is information on the attribute of the service provider S desired by the service user U. The attribute may include an age, a gender, a personality (type), and the like in addition to the type of a service to be provided. With regard to the attribute, the service management device 700 may present attributes to the service user U to allow the service user U to select or determine the attributes rather than fixedly allocating a perfectly matching service provider S.

[Service Use Request Information]
  User ID
  Position information (longitude, latitude, and altitude)
  Desired use space information (for example, represented by number of persons, number of seats, and the like)
  Desired use service provider attribute information
  Desired use service ID
  Desired use segment information
  Information on service use hours desired by service user
  Payment authentication information

[Vehicle]

Figure 21:
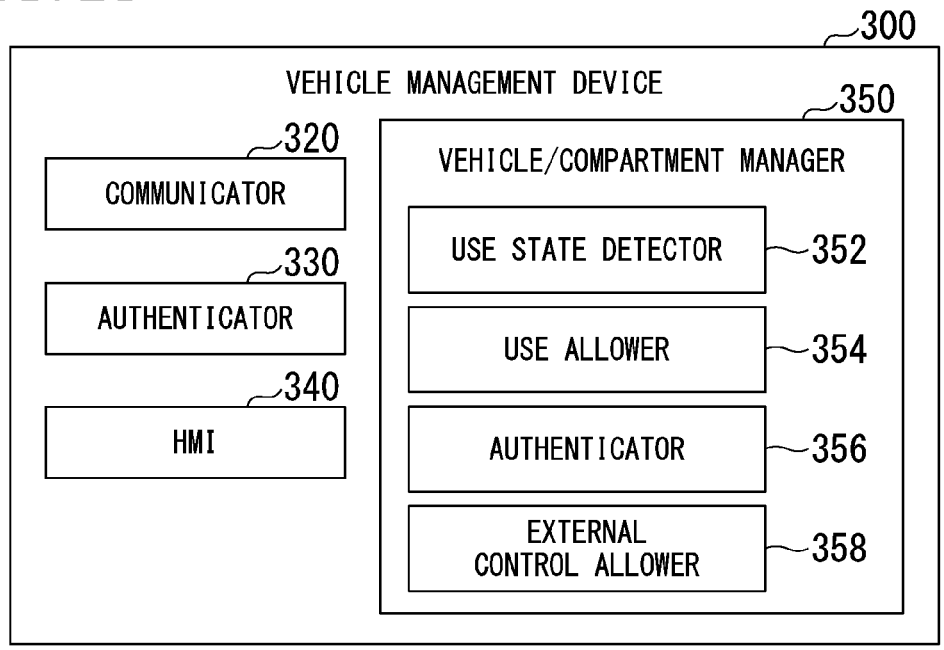
FIG. 21 is a diagram illustrating an example of a configuration of a vehicle management device 300 mounted in a vehicle 100.

A configuration (for example, a configuration related to automated driving) related to travel control of the vehicle 100 according to the second embodiment is similar to the configuration of the vehicle 100 of the first and second embodiments. That is, the vehicle 100 is an automated driving vehicle and is a vehicle having a wireless communication function as described later. FIG. 21 is a diagram illustrating an example of a configuration of a vehicle management device 300 mounted in the vehicle 100. The vehicle management device 300 is mounted in the first upper unit 200A, for example. The vehicle management device 300 includes a communicator 320, an authenticator 330, an HMI 340, and a vehicle/compartment manager 350.

The communicator 320 is a wireless communication device. The communicator 320 communicates with the service management device 700 via the network NW. The authenticator 330 performs an authentication process for starting services according to an instruction of the service management device 700.

The HMI 340 receives an input operation on accessories and outputs information output from accessories as images or sound, for example. For example, the HMI 340 includes a touch panel display device, a speaker, a microphone, and the like.

The vehicle/compartment manager 350 includes, for example, a use state detector 352, a use allower 354, an authenticator 356, and an external control allower 358. One or more spaces (compartments) usable by the service user U and the service provider S are provided in the vehicle 100, and the use state detector 352 detects the use state of each compartment. For example, the use state detector 352 detects whether each compartment is being used. Although an ordinary passenger car is illustrated as the vehicle 100 in FIG. 21, the vehicle 100 may be a vehicle such as a trailer, a bus, or a microbus having such a size that one or more occupants can enter each of compartments that divide the inside of a passenger compartment. When the authentication by the authenticator 356 succeeds, for example, the use allower 354 allows the use of a predetermined compartment and unlocks a door, for example. The authenticator 356 performs authentication such as checking of the identity of the service user U or the service provider S who comes to board the vehicle.

The external control allower 358 determines whether the control of the traveling unit 110 according to the operation of a user on accessories will be allowed on the basis of the identification information of the accessories connected to the first upper unit 200A and the control information of the accessories acquired from the service management device 700. For example, the user riding on the compartment of the upper structure 200 may operate the terminal device 500 connected to the service providing device 212 to operate the traveling unit 110. In this case, the external control allower 358 allows the user U to operate the traveling unit 110 when it is authenticated that a combination of the target traveling unit 110 operated by the user U and the first upper unit 200A provided in the upper structure 200 on which the user U rides is an authorized combination on the basis of the identification information of accessories connected to the first upper unit 200A and the control information of the accessories acquired from the service management device 700.

The communicator 320 of the vehicle management device 300 transmits vehicle information including the following content to the service management device 700, for example.

[Vehicle Information]
  Traveling unit ID for identifying the traveling unit 110
  Upper unit ID for identifying the upper unit 200A
  Position information (longitude, latitude, and altitude)
  Compartment use state (user ID of service user using compartment, available compartment information, and the like)
  Traveling state (speed, acceleration, angular speed, in-vehicle device state, and the like)
  Information on service provider S (ID of service provider, information on service being provided, elapsed time of service being provided, and the like)
  Accessory information (identification information of accessory, encoded data of identification information of accessory, and the like)

Figure 22:
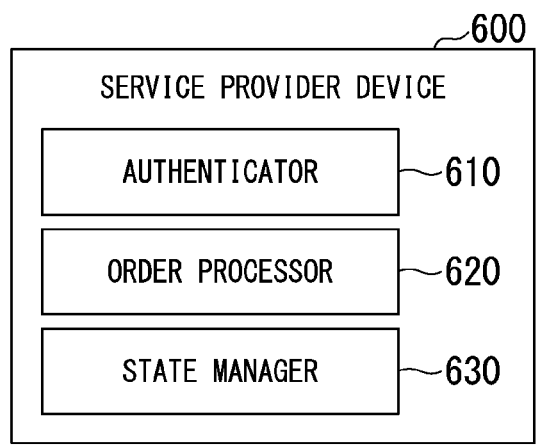
FIG. 22 is a diagram illustrating an example of a configuration of a service provider device 600.

FIG. 22 is a diagram illustrating an example of a configuration of the service provider device 600. The service provider device 600 is a device that can detect the states of a plurality of service providers and can automatically respond to an order from the service management device 700, for example. The service provider device 600 includes, for example, a communicator 610, an order processor 620, a state manager 630, and a storage 650.

The communicator 610 communicates with the service management device 700 and the like via the network NW. The order processor 620 receives a service order from the service management device 700. The order processor 620 determines whether the content of a service order is within the range of service providing information having been transmitted to the service management device 700 and performs an order receiving process when the content is determined to be within the range. The state manager 630 manages the state (a reservation state, an activation state, and the like) of the service provider S registered in the service provider device 600 and provides service providing information to the service management device 700.

The service provider device 600 transmits service providing information including the following content to the service management device 700, for example. The service providing information is information related to services for which the service provider S can accept an order.

[Service Providing Information]
  Authentication ID
  Accessory control information (for example, firmware update information, operation request, information transmission request, and the like)
  Service name
  Control signal

[Service Management Device]

Figure 23:
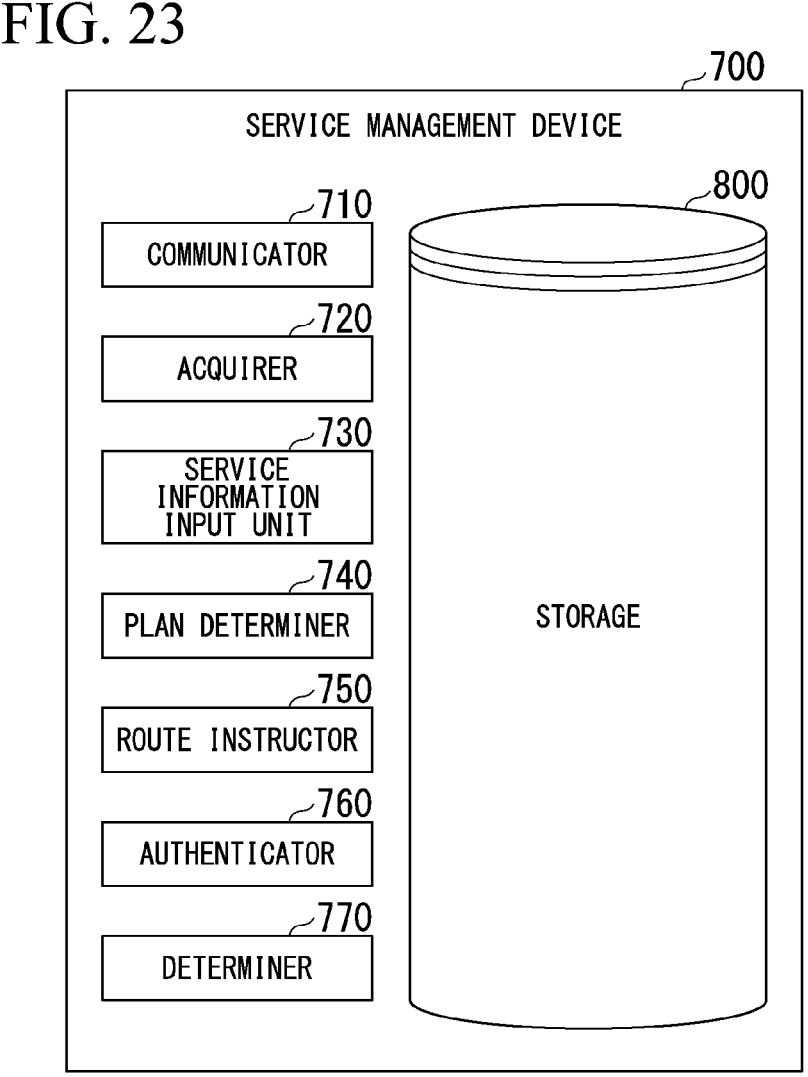
FIG. 23 is a diagram illustrating an example of a configuration of a service management device 700.

FIG. 23 is a diagram illustrating an example of a configuration of the service management device 700. The service management device 700 includes, for example, a communicator 710, an acquirer 720, a service information input unit 730, a plan determiner 740, a route instructor 750, an authenticator 760, a determiner 770, and a storage 800. Components excluding the communicator 710, the service information input unit 730, and the storage 800 are realized when a hardware processor such as a CPU executes a program (software). Some or all of these components may be realized by hardware (including circuitry) such as LSI, ASIC, FPGA, or GPU and may be realized by cooperation of software and hardware. The program may be stored in advance in a storage device such as an HDD or a flash memory and may be stored in a removable storage medium such as DVD or CD-ROM and be installed on a storage device when the storage medium is mounted on a drive device. The storage 800 is realized by an HDD, a flash memory, a RAM, a ROM, or the like.

The communicator 710 includes a network card for connecting to the network NW, for example. The communicator 710 communicates with the vehicle management device 300, the terminal device 500, the service provider device 600, and the like via the network NW.

The acquirer 720 acquires service use request information from the terminal device 10 via the communicator 710, acquires vehicle information from the vehicle management device 300 of the vehicle 100 registered in advance, and acquires service providing information from the service provider device 600.

The service information input unit 730 receives the inputs such as the type and the details of a service to be provided from the service provider S.

The plan determiner 740 specifies an available service that the service user U can enjoy on the basis of available vehicle information 820 and the service providing information and provides information on the specified available service to the terminal device 500 of the service user U.

More specifically, the plan determiner 740 sets an allowed use segment in which the service provider S can occupy at least a portion (for example, a compartment) of the vehicle 100 in the travel route of the vehicle 100 on the basis of the desired use segment included in the available vehicle information 820 and the service providing information.

The route instructor 750 gives an instruction on a route on which the vehicle 100 has to travel to the vehicle 100 by causing the communicator 710 to transmit information on a use start position and a use end position of the service user U and information on a use start position and a use end position of the service provider S to the vehicle 100.

The authenticator 760 performs authentication of the service user U and performs authentication at the start of providing services by communicating with the terminal device 500.

The determiner 770 determines whether each of the service user U and the service provider S uses the vehicle 100.

The plan determiner 740 performs various processes using the determination result obtained by the determiner 770. For example, the plan determiner 740 may accept change in the desired use segment only when the determiner 770 determines that both the service user U and the service provider S use the vehicle 100. This case occurs, for example, when the service provider S suggests the service user U to change a destination and to change a final destination during services on the basis of the information provided to the vehicle 100. The plan determiner 740 may allocate the vehicle 100 being used to the service user U preferentially when the determiner 770 determines that the service user U is already using the vehicle 100 (that is, the service user U has extended the service or has requested another service while using a service) at a time point when the acquirer 720 received the service use request information.

Service management information including the following content, for example, is stored in the storage 800.

[Service Management Information]

User ID for identifying service requester A (service user U)

Service ID for identifying service provided by service provider S

Traveling unit ID and upper unit ID

Firmware ID of upper unit 200A

Firmware ID of traveling unit 110

Encoded data from vehicle

Encoded data from service provider

Present position information of vehicle 100

Service provider ID

Figure 24:
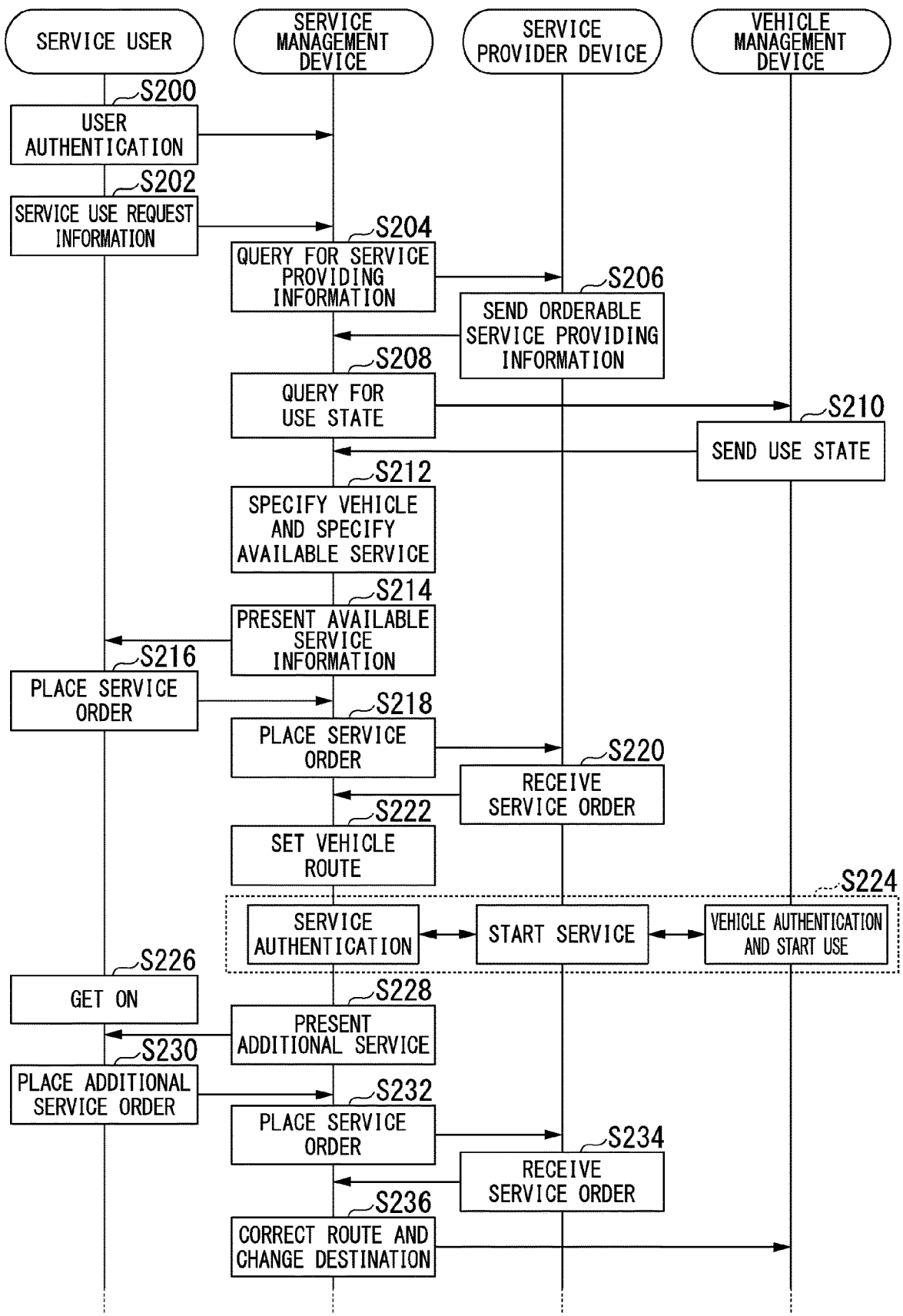
FIG. 24 is a flowchart illustrating an example of the flow of processes executed by the service providing system 2.

FIG. 24 is a flowchart illustrating an example of the flow of processes executed in the service providing system 2. First, a service requester A (the service user U) performs user authentication with respect to the authenticator 760 of the service management device 700 using the terminal device 500 (step S200). When the authentication of the authenticator 760 succeeds, the service requester A (the service user U) transmits service use request information to the service management device 700 using the terminal device 500 (step S202). The service use request information is acquired by the acquirer 720 and is stored in the storage 800 as service request management information 832.

When the service use request information is acquired, the acquirer 720 of the service management device 700 sends a query for service providing information to the service provider device 600 (step S204). A plurality of service provider devices 600 may be present depending on the attribute of a service to be provided and a service provider. In this case, the acquirer 720 may send a query to the plurality of service provider devices 600 simultaneously. The state manager 630 of the service provider device 600 replies to the service management device 700 with the service providing information related to a service for which an order can be accepted (indicating the details of a service for which an order can be accepted) (step S206).

On the other hand, the acquirer 720 of the service management device 700 sends a query for a use state (vehicle information) to the vehicle management device 300 (step S208). The vehicle/compartment manager 350 of the vehicle management device 300 replies to the service management device 700 with the use state detected by the use state detector 352 (step S210). The processes of steps S208 and S210 may be performed at an arbitrary timing whenever necessary asynchronously with the processes illustrated in the flowchart.

Next, the plan determiner 740 specifies an available vehicle on the basis of the service use request information and the information acquired in step S210 and generates available vehicle information acquired in step S206 (step S212). A plurality of vehicles may be specified in step S212. In this case, a final vehicle may be specified in the processes up to step S224 to be described later. The plan determiner 740 specifies an available service that the service user can enjoy on the basis of the available vehicle information an the service providing information indicating a service for which an order can be accepted (step S212) and transmits available service information indicating the details of the specified available service to the terminal device 500 (step S214).

The service applicant A (the service user U) browses the available service information, and as a result, places an order for services to the service management device 700 using the terminal device 500 (step S216). The plan determiner 740 of the service management device 700 extracts a part to be provided by the service provider among the services for which an order was received in step S216 and places an order for services to the service provider device 600 (step S218).

The order processor 620 of the service provider device 600 transmits a notice indicating that an order for a service has been received to the service management device 700 (step S220). In addition to this, the order processor 620 transmits the details of the order to the terminal device (not illustrated in the present embodiment) of the service provider.

Upon receiving the order notice from the service provider device 600, the route instructor 750 of the service management device 700 sets a route along which the vehicle 100 has to travel to be provided with services (step S222).

Subsequently, the authenticator 760 of the service management device 700 performs an authentication process for starting services with respect to the authenticator 330 of the vehicle 100 and the service provider device 600, the route instructor 750 sends an instruction on the route set in step S222 to the vehicle 100, the service provider device 600 performs authentication for starting services and specifies a final vehicle as necessary, the authenticator 330 of the vehicle management device 300 of the vehicle 100 performs vehicle-side authentication, and the vehicle 100 starts or plans traveling along the instructed route (step S224).

In the authentication process of S224, for example, the service provider device 600 acquires information on accessories connected to the available upper unit 200A. That is, the information on accessories is transmitted from the vehicle 100 to the service provider device 600. Here, authentication may be performed in two steps for the upper unit 200A and the accessories. When the owner of the upper unit 200A is different from the service provider, the function of the accessory connectable to the upper unit 200A or the vehicle state sharing allower 115a of the traveling unit 110 executable by the upper unit 200A may be defined separately by the owner or a travel manager.

After that, when the service user U boards the vehicle 100 (step S226) and an additional service can be presented, the plan determiner 740 presents an additional service to the terminal device 500 (step S228).

When the service user U boards the vehicle 100 (S226), the service provider may set availability of the accessories of the vehicle 100 which the user has board. In this case, the vehicle state sharing allower 115a allows the setting information on the availability of the accessories to be shared with the service management device 700. The service management device 700 may set the availability of the accessories. The accessories may include a video player, a power feeder, and the like provided in a compartment, for example. When the use of accessories is allowed, an occupant boarding the vehicle 100 can operate and use the accessory. In this case, the traveling state of the vehicle 100 and operation information or use information of accessories may be shared with the service provider device 600 when allowed by the vehicle state sharing allower 115a.

When the service user browses the details of an additional service and places an order for an additional service using the terminal device 500 (step S230), the plan determiner 740 of the service management device 700 places a service order for the additional service to the service provider device 600 (step S232). The order processor 620 of the service provider device 600 transmits information indicating that an order for an additional service has been received to the service management device 700 (step S234).

In the process of S234, for example, when an occupant places an order for services via accessories (for example, a specific video contents is played using accessories), the order processor 620 of the service provider device 600 sets a route and a destination appropriate for the service again simultaneously with reception of the order for the service and sends an instruction related to the route and destination to the vehicle 100. More specifically, a functional unit such as the order processor 620 of the service provider device 600 corrects the route so as to pass through a stop set by the service provider device 600 according to the details of the contents such as a sightseeing guidance and adjusts a passing speed according to a description hour. In this case, any one of the functional units of the service provider device 600 provided in the upper unit 200A is an example of an "external control allower". In this way, a service provided by the service provider can be linked with a control state of the vehicle 100 and accessories disposed arbitrarily in the vehicle 100, and the degree of freedom of the service provider arranging the accessories linked with travel can be enhanced.

Upon receiving information indicating that an order for an additional service has been received, the route instructor 750 of the service management device 700 sends an instruction related to correction of the route and change in the destination to the vehicle 100 (step S236).

According to the configuration of the third embodiment described above, similarly to the first or second embodiment, it is possible to provide the vehicle 100 which can be used in a plurality of uses. Due to this, independent development by many business operators can be allowed, and a broad and deep range of functions specialized for respective uses can be provided.

While modes for carrying out the present invention have been described using embodiments, the present invention is not limited to these embodiments, but various modifications and replacements can be made without departing from the spirit of the present invention.

DESCRIPTION OF REFERENCE NUMERALS

100 Automated driving vehicle
110 Traveling unit
112 Communication device (Acquirer)
113b Navigation controller (Driving plan generator),
115 Automated driving control unit (Automated driving controller)
151 Connector (First connector)
153 Connector (Second connector)
155 Connector (Second connector)
200 Upper structure
211 Passenger compartment
213 Luggage compartment
W Wheel
W1 First wheel
W2 Second wheel
R Attachment region
G Ground surface
X Vehicle traveling direction
Y Vehicle width direction

What is claimed is:

1. An automated driving vehicle comprising:
an upper structure; and
a traveling unit comprising
a hardware processor executing software, hardware including circuitry, or a cooperation of the software and the hardware configured to operate as:
a power supply interface configured to supply electric power to the upper structure; and
a first communication interface configured to communicate with the upper structure;
the upper structure comprising a plurality of different accessories connected thereto via the power supply interface and the first communication interface,
wherein the traveling unit is connectable, at an attachment region, to an upper unit mounted on the upper structure, the attachment region is a planar form that extends horizontally and forms a portion of an upper surface of the traveling unit and supports the upper unit from a lower side, and
wherein the traveling unit operates while sharing the electric power supplied to the upper structure and details of a communication with the upper structure.

2. The automated driving vehicle according to claim 1, wherein the hardware processor executing software, the hardware including the circuitry, or the cooperation of the software and the hardware are further configured to operate as:
a second communication interface that transmits information indicating a connection state of an accessory of the plurality of different accessories to an external device.

3. The automated driving vehicle according to claim 1, wherein the hardware processor executing software, the hardware including the circuitry, or the cooperation of the software and the hardware are further configured to operate as:
an external control allower, included in the upper unit, configured to determine whether control of the traveling unit via an accessory of the plurality of different accessories according to a user's operation on the accessory will be allowed based on identification information of the accessory connected to the upper unit and control information of the accessory acquired from an external device.

4. The automated driving vehicle according to claim 1, wherein the hardware processor executing software, the hardware including the circuitry, or the cooperation of the software and the hardware are further configured to operate as:
a vehicle state sharing allower configured to allow an accessory of the plurality of different accessories or a terminal device connected to the accessory to share information of the traveling unit on the basis of the identification information of the accessory connected to the upper unit and control information of the accessory that is updated based on information acquired from an external device.

5. The automated driving vehicle according to claim 1, wherein
the traveling unit includes a vehicle state sharing allower that allows the upper unit or a terminal device specified based on identification information of the upper unit to share information of the traveling unit on the basis of the identification information of the upper unit and control information of an accessory of the plurality of different accessories that is updated based on information acquired from an external device.

6. The automated driving vehicle according to claim 1, wherein
the plurality of different accessories comprise at least one of a human machine interface, a seat device, a collision sensor, an airbag device, and a service providing device.

* * * * *